United States Patent
Jones

(10) Patent No.: US 7,552,870 B2
(45) Date of Patent: Jun. 30, 2009

(54) TRADING NETWORK RESOURCES

(76) Inventor: Adrian Jones, 5 rue des Lilas, Monaco, MC98000 (MC)

( * ) Notice: Subject to any disclaimer, the term of this patent is extended or adjusted under 35 U.S.C. 154(b) by 412 days.

(21) Appl. No.: 11/378,500

(22) Filed: Mar. 16, 2006

(65) Prior Publication Data
US 2007/0215684 A1    Sep. 20, 2007

(51) Int. Cl.
*G06K 5/00* (2006.01)

(52) U.S. Cl. ............... 235/380; 705/39; 705/40; 235/379

(58) Field of Classification Search ........... 235/379, 235/380; 705/39–40; 709/217
See application file for complete search history.

(56) References Cited

U.S. PATENT DOCUMENTS

| | | | |
|---|---|---|---|
| 2004/0042596 A1 | 3/2004 | Kim et al. | |
| 2004/0158618 A1* | 8/2004 | Shaw | 709/217 |

* cited by examiner

*Primary Examiner*—Michael G Lee
*Assistant Examiner*—Kristy A Haupt
(74) *Attorney, Agent, or Firm*—Blakely, Sokoloff, Taylor & Zafman

(57) ABSTRACT

A Network Resource Trading Exchange which allows Access Gateway Operators (who are usually also Network User Device Users) to trade usage of Network Resources (e.g. Internet access) via their Access Gateway for usage of Network Resources via other Access Gateway Operators' Access Gateways. Owners of Internet-connected wireless Access Gateways are enabled to trade Internet access via their own infrastructure for roaming access via other Access Gateways anywhere in the world. Access Gateway Operators can use their underutilized Network Resources to pay for Network Resource usage elsewhere, without having to purchase any subscription or pre-payment plan.

15 Claims, 24 Drawing Sheets

TRADING NETWORK RESOURCES

SUMMARY OF TERMS USED IN THIS DOCUMENT

Network Resource: any service or facility that can be made available and accepted for use or delivery by digital transmission over a network, even if actual fulfilment is carried out by some alternate means. May include Internet or other network access, data storage and data processing, among others.

Network Resource Access Gateway ("Access Gateway"): the device (or collection of devices) that controls access to Network Resources of any kind (e.g. access point, wireless gateway, router, wireless router, switch, application gateway, etc.)

Network User Device ("Device"): any network-capable device (e.g. laptop computer, PDA, smartphone, video games machine, music/video player, measurement instrument, digital camera, etc.) that can connect to a network via a Network Resource Access Gateway and make use of any Network Resource.

Network Resource User ("User"): Any person or entity that uses or controls a Network User Device to gain access to Network Resources via a Network Resource Access Gateway.

Network Resource Access Gateway Operator ("Access Gateway Operator"): The operator of one or more Network Resource Access Gateways.

Billing Service Provider: the entity that is responsible for invoicing or otherwise charging a Network Resource User for Network Resources used and for corresponding settlement of payments due to Network Resource Access Gateway Operators.

Network Resource AAA System ("AAA System"): the system responsible for authenticating Network Resource Users, authorizing their access to particular Network Resources and accounting for those Network Resources utilized; usually operated by the Billing Service Provider.

Network Resource Trading System ("Trading System"): this system is a superset of a Network Resource AAA System, with the addition of the ability to settle accounting charges by trading credits earned and stored within the system for authorized usage of Network Resources.

BACKGROUND OF THE INVENTION

Millions of Users of wireless Network User Devices travel locally, nationally or internationally with their Network User Devices (laptops, PDAs, etc.) but are unable to gain authorized access to the Internet via most of the currently deployed Network Resource Access Gateways (typically, Internet-connected, wireless access points/routers, such as those marketed by Cisco, Nortel, Linksys, Netgear, D-Link, etc.). More than 10 million Internet-connected wireless Access Gateways have already been deployed worldwide but they are frequently security-protected to prevent roaming Users from consuming Network Resources that they have not paid for. Commercial wireless 'hotspots', allowing paid-for access, have been springing up for several years in places such as coffee shops, airport lounges, hotels and railway stations. The majority of these hotspots require payment through a Billing Service Provider, whether directly (e.g. via subscription, pre-paid vouchers or payment using a bank card) or indirectly (e.g. a hotel adds the charges to its guests' expense folio and subsequently pays all or a portion of the charges to the Billing Service Provider).

The main problem with existing forms of paid access is that the coverage provided by each Billing Service Provider remains extremely sparse (in terms of geographical coverage), notwithstanding the increasing number of roaming agreements in place between different Billing Service Providers. Many Users are reluctant to sign up and pay for services that they will only be able to use in a very limited number of hotspot locations. Hotspot operators therefore usually find it hard to generate reasonable revenue from the volume of Users, so tend to keep charges high, thereby further discouraging Users from signing up. The largest international Billing Service Providers that provide roaming access via wireless hotspots (e.g. Boingo, GoRemote, T-Mobile, Wayport, WeRoam, Orange, BTOpenzone or iPass) currently only offer access via up to 20,000 Access Gateways around the world, in spite of more than 10 million wireless Access Gateways currently being deployed.

What is needed is an effective means of turning many of those wireless Access Gateways into hotspots by providing an alternate means of authorization and settlement: one that allows Users to trade access to Network Resources via their own Access Gateway for access via others' when roaming. This would enable, for example, each individual who has installed a suitable Internet-connected wireless Access Gateway to trade usage of their underutilized Internet connection for access via others', anywhere in the world, without having to make any traditional form of payment.

SUMMARY OF THE PRIOR ART

The prior art for authorization and settlement of charges for Network Resource usage can be divided into two fields: existing authorization and payment systems for access to Network Resources and existing telecommunications trading systems.

a. Existing Authorization and Payment Methods and Systems for Access to Network Resources Various prior art methods and systems exist to enable Users to pay for access to Network Resources in locations where they are not entitled to free access (i.e. typically when roaming). For example, U.S. Pat. No. 6,526,390 by Wang, J. and Gorrepati, P. describes a method and system for 'Independent Billing Settlement for Call Origination by Wireless Subscribers Roaming to Foreign Wireless Networks', in which a valid credit card is used for authorization and to settle charges for Network Resource usage via a foreign Access Gateway. This invention is primarily oriented towards roaming with a GSM mobile device but could apply equally to other wireless technologies.

Authorization methods and accounting systems for wireless internet device roaming have primarily been built around the RADIUS accounting standards (RFC 2865/2866) but may also be built around DIAMETER (RFC 3588), CRANE (RFC 3423), CIBER, TAP and IPDR (ipdr.org). These standards specify how accounting data is moved around a network but do not address the actual settlement of charges by Network Resource Users. Equally, they do not incorporate the concept of trading Network Resources by allowing earned credits from provision of access to Network Resources to be used to settle charges for usage of Network Resources by Network Resource Users. The present invention differs from this prior art by allowing credits earned for provision of access to Network Resources to be applied during the authorization and accounting process to support authorization and settlement of charges for usage of Network Resources, without requiring external settlement of the Network Resource User's account.

Prior art payment methods can be divided into two categories: pre-payment and post-payment, depending on whether payment precedes the usage of Network Resources or follows it. In each case, direct or indirect payment from the User (or their organization) to a Billing Service Provider is required for each User who wishes to make use of third-party Access Gateways to access Network Resources.

Pre-payment

Existing pre-payment plans often take the form of vouchers or scratch-cards, which the User purchases using normal financial payment means (cash, credit card, cheque, etc.), or involve the User making an online purchase using his/her credit card or bank card. Some pre-payment plans expire a certain period after they are first purchased or first used. (e.g. 1,000 minutes of usage may be valid for 30 days after purchase). The following charging models are used in pre-payment plans:

a. For one or more fixed periods of usage (e.g. for an hour, 1,000 minutes, until midnight, until check-out time, 24-hour period, calendar day, month, etc.); or
 b. For a fixed volume of usage (e.g. for 100 MB of transfer); or
 c. For a fixed value of usage, depending on the prevailing time- or volume-based charges on the Access Gateway at the time of connection (e.g. pre-pay $25); or
 d. A combination of one or more of the above.

Post-payment

Post-payment plans are settled by Users (or their organizations) using normal forms of financial payment, such as bank transfers, cash, credit card, cheques, etc. The following charging models are used in post-payment (typically subscription-based) plans:

a. For one or more periods of usage (e.g. per minute, per day or per month).
 b. For a volume of usage (e.g. per 100 MB)
 c. A combination of the above (e.g. first 1 GB per month for $30, then $1 per hour)

2. Telecommunications Trading Systems and Methods

In the general area of telecommunications trading, ANIP's U.S. Pat. No. 6,005,926 discloses a method for trading telecommunications services and Arbinet's U.S. Pat. No. 6,731,729 discloses a method for settlement of trading accounts in relation to telecommunications services. These patents disclose methods that involve matching buyers and sellers of certain Network Resources; U.S. Pat. No. 6,731,729 further provides for credit balances (in the form of an account receivable) earned through provision of Network Resources to be traded for usage of Network Resources. These patents disclose prior art that involves matching suitable buyers and sellers from among a plurality of buyers and sellers, rather than operating as an authorization/denial process for a specific buyer/seller pair. The present invention differs from the prior art in a variety of aspects, notably in that there is no matching requirement but instead an authorization/denial component, which requires sending a reply to the requester, explicitly authorizing or denying provision of Network Resources by the seller.

SUMMARY OF THE PRESENT INVENTION

The present invention is a Network Resource Trading Exchange, which allows Access Gateway Operators (who are usually also Network User Device Users) to trade usage of Network Resources (e.g. Internet access) via their Access Gateway for usage of Network Resources via other Access Gateway Operators' Access Gateways. For example, it allows owners of Internet-connected wireless Access Gateways to trade Internet access via their own infrastructure for roaming access via other Access Gateways anywhere in the world. The invention provides a means for Access Gateway Operators to use their underutilized Network Resources to pay for Network Resource usage elsewhere, without having to purchase any subscription or pre-payment plan, as is required with the prior art.

DETAILED DESCRIPTION OF THE INVENTION

Figure 1:
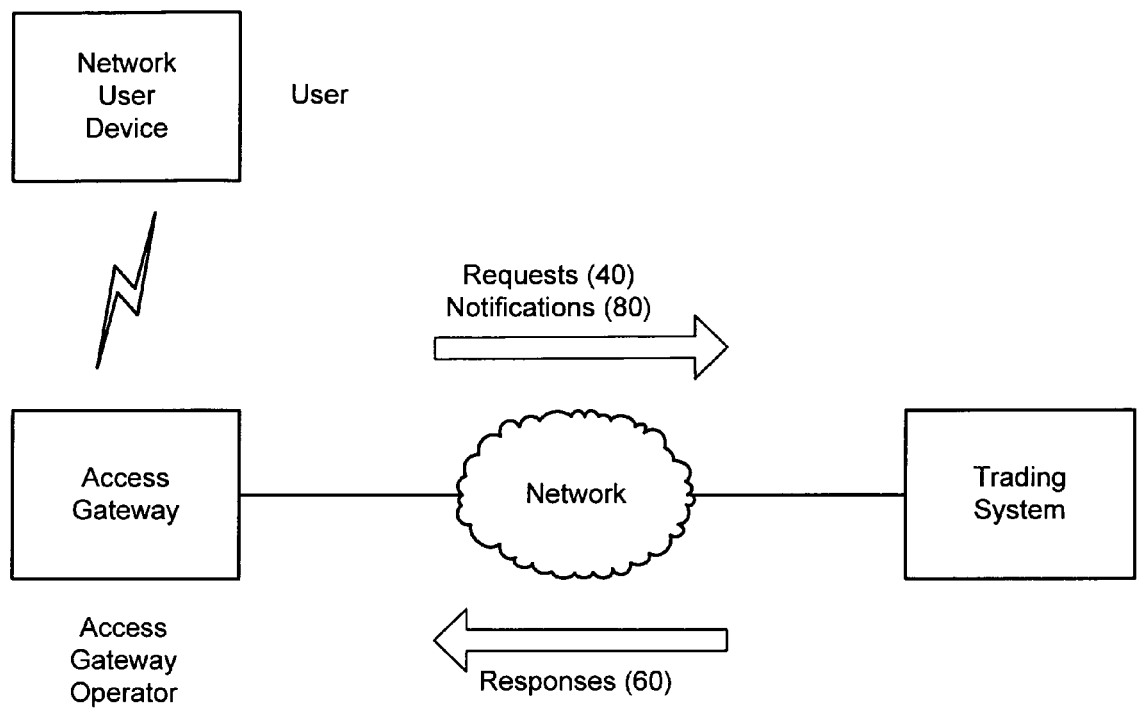
FIG. 1 shows the context in which the invention operates.

FIG. 1 shows that the Network User Device requests access to a Network Resource over a wireless link to the Access Gateway. The Access Gateway sends Requests and Notifications—and receives Responses—over the Network to the Trading System (i.e. the invention) in relation to providing access to the Network Resource to the Network Device.

Figure 2:
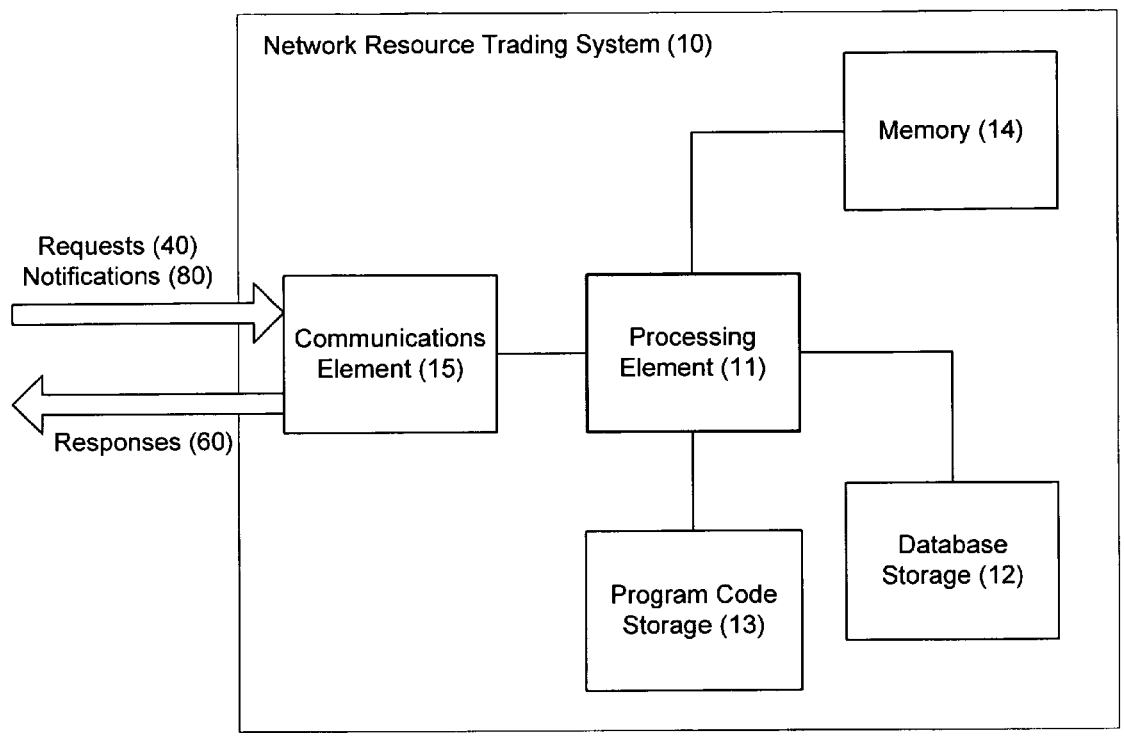
FIG. 2 shows a more detailed schematic of the components of the Trading System in the diagram above.

FIG. 2 illustrates the components that constitute the system of the invention: the Network Resource Trading System (10).

In particular embodiments, the Network Resource Trading System (10) is implemented using standard commercial components. In one embodiment, the entire system is implemented as a single computer server (e.g. an Intel/Windows unit, Unix server, Linux server, etc.), comprising one or more microprocessors as the Processing Element (11), RAM as Memory (14), an Ethernet network card supporting a suitable network protocol (e.g. TCP/IP) and connected to an external Network as the Communications Element (15), a hard disk for Program Code Storage (13) and the same or another hard disk for Database Storage (12). In this embodiment, the interconnection between the components includes the computer's internal communications bus.

An alternate embodiment is a larger scale implementation of the Network Resource Trading System (10), where scalability and redundancy are necessary to meet User reliability expectations in case of individual component failure. In this embodiment, the Processing Element (11) may include multiple dedicated networked computer servers (e.g. Intel/Windows units, Unix servers, Linux servers, etc.) either co-located or distributed in different geographical locations. These computer servers would typically contain the Memory (14), in the form of RAM, and the Program Code Storage (13), usually in the form of one or more hard disks per server; these three elements would typically be interconnected over the computer server's internal communications bus. Database Storage (12) would typically be on one or more networked database servers, configured to run commercial database management software, such as Oracle. The Communications Element (15) might be implemented as multiple dedicated computer servers, configured to pre-process incoming Requests (40) and Notifications (80) received over an external network interface to check for validity before passing them over an internal network connection (e.g. Gigabit Ethernet) to the Processing Element (11) for further processing. The connection between the Communications Element (15) and the Processing Element (11) may incorporate a firewall or other security components to protect the integrity of the Processing Element (11), the Database Storage (12), the Program Code Storage (13) and the Memory (14) from various forms of external attack. The Processing Element (11) would be connected over a high-speed network (e.g. Gigabit Ethernet) to the Database Storage (12). The Communications Element (15) would be responsible for transmitting any Responses (60) over the external network connected to the Network Resource Trading System (10).

Many variations on either of these embodiments are possible.

In various embodiments, the Database Storage (12) is a relational database management system that stores multiple database tables. In the embodiment of the invention detailed below, the Database Storage (12) would comprise the following database tables:

Trading System User Table (100)
Network Resource Access Gateway Table (200)
Network Device Table (300)
Account Record Table (400)
Session-in-Progress Table (500)

Each of these tables would comprise at least one record, further comprised of data fields as described below. The details described below also provide sample record data and example field values for the purpose of assisting in the explanation of the invention.

Trading System User Table (100)

The Trading System User Table contains information about each unique User tracked by the Network Resource Trading System (10); a unique User is one who is responsible for one or more Network User Devices and/or one or more Access Gateways. Each Account Record has its own Account UniqueID (101), which identifies it uniquely in the System. In this embodiment, the Email Address (102) is used by the System to communicate necessary information (e.g. low balance, zero balance, security problems, etc.) to the User. A Password (103) is used to allow a User to login to the System (for example via a website) and check and/or modify information (e.g. Cash Balance, Email Address, etc.). The password would usually be stored in an encoded format but is shown here un-encoded to clarify the explanation. In this embodiment, the Earned Balance UniqueID (104) and Cash Balance UniqueID (105) are unique identifiers that act as keys to accounts stored in the Account Record Table (400), representing the User's Earned Balance and Cash Balance respectively. In other embodiments, a single account might be used, with earned credits and cash credits being made to the same account and charges for Network Resources used also charged to the same account. The Number of Network Devices (106) and Number of Access Gateways (107) keep track of the number of Network User Devices and number of Access Gateways operated by this User.

Sample Record 1 (151)

| Reference | Field Description | Example Value |
|---|---|---|
| (101A) | UniqueID | U928378 |
| (102A) | Email Address | scott.frew@hiflywifi.com |
| (103A) | Password | Flyingboats |
| (104A) | Earned Balance UniqueID | 1034243 |
| (105A) | Cash Balance UniqueID | 1034244 |
| (106A) | Number of Network Devices | 0 |
| (107A) | Number of Access Gateways | 3 |

Sample Record 2 (152)

| Reference | Field Description | Example Value |
|---|---|---|
| (101B) | UniqueID | U673488 |
| (102B) | Email Address | brad.albright@golfinggourmets.com |
| (103B) | Password | Holeinone |
| (104B) | Earned Balance UniqueID | 823134 |
| (105B) | Cash Balance UniqueID | 823135 |
| (106B) | Number of Network Devices | 1 |
| (107B) | Number of Access Gateways | 1 |

Network Resource Access Gateway Table (200)

The Network Resource Access Gateway Table contains information about each unique Access Gateway tracked by the Network Resource Trading System (10). Each Account Record has its own Account UniqueID (201), which identifies it uniquely in the System, as well as an Owned by UniqueID (202), which identifies the UniqueID of the Access Gateway's owner, a registered Trading System User. Network Address (203) stores the currently registered network address (in this case, an Ethernet MAC address) of the Access Gateway device. This is used for security purposes to help prevent unregistered Access Gateways from using the Network Resource Trading System (10). The SSID (204) field stores the Service Set Identifier that would usually be seen by the User of a wireless Device user when connecting to an Access Gateway. The purpose of this information, along with the Location (205) and Device Description (206), is to enable the Access Gateway Operator to easily differentiate between different Access Gateway devices that they are managing, as well as to provide helpful information to a Device User when providing a list of transaction charges (i.e. billing). The Charge per Hour (207) is the charge per hour (e.g. $2.00 in this case) for using this Access Gateway via the Network Resource Trading System (10). The Shared Secret (208) is used as part of the authentication and decoding/encoding process when Requests (40), Responses (60) and Notifications (80) are communicated between an Access Gateway and the Network Resource Trading System (10). The Earned Balance UniqueID (209) is a unique identifier that acts as a key to an account stored in the Account Record Table (400), representing the Access Gateway's Earned Balance. In some embodiments, the Earned Balance UniqueID (209) might be used to allow automatic (e.g. based on a set of configurable rules) or manual (e.g. under direct control of the account owner) transfer of all or part of the Earned Balance to the account balance available for consumption by a Network User Device that is under the same owner's control. The Consolidate Earnings? (210) field is used by the System to determine whether any earned balance for this Access Gateway should be consolidated to the Earned Balance of its owner, a registered Trading System User. The Time Earnings last Cleared (211) is used in conjunction with the Consolidate Earnings? (210) field to record the time at which the Access Gateway's owner last reset the balance on the account of the Earned Balance UniqueID (209) to zero. This can only be done if the earnings are being consolidated and provides a means for the owner to monitor daily/weekly/monthly earnings on a per Access Gateway basis.

Sample Record 1 (251)

| Reference | Field Description | Example Value |
|---|---|---|
| (201A) | UniqueID | A2766274 |
| (202A) | Owned by UniqueID | U928378 |
| (203A) | Network Address | 00:12:84:AE:C2:90 |
| (204A) | SSID | Roof of Paris WiFi |
| (205A) | Location | 2nd stage, Eiffel Tower, Paris, France |
| (206A) | Device Description | 802.11 g/ADSL router in office |
| (207A) | Charge per Hour | 2.00 |
| (208A) | Shared Secret | Ghq78rY3243Uhk72 |
| (209A) | Earned Balance UniqueID | 1034834 |
| (210A) | Consolidate Earnings? | Yes |
| (211A) | Time Earnings last Cleared | 00:00:00, May 1, 2005 |

Sample Record 2 (252)

| Reference | Field Description | Example Value |
|---|---|---|
| (201B) | UniqueID | A2128832 |
| (202B) | Owned by UniqueID | U673488 |
| (203B) | Network Address | 00:34:82:E4:72:30 |
| (204B) | SSID | Golfing Gourmet Wireless |
| (205B) | Location | 19th hole, Green Canyon Golf Course |
| (206B) | Device Description | 802.11 g router in restaurant |
| (207B) | Charge per Hour | 1.00 |
| (208B) | Shared Secret | Kjh32478FKkj34TJ |
| (209B) | Earned Balance | 823169 |
| (210B) | Consolidate Earnings? | Yes |
| (211B) | Time Earnings last Cleared | 00:00:00, May 1, 2005 |

Network Device Table (300)

The Network Device Table contains information about each unique Network User Device tracked by the Network Resource Trading System (10). Each Account Record has its own Account UniqueID (301), which identifies it uniquely in the System, as well as an Owned by UniqueID (302), which identifies the UniqueID of the Network User Device's owner, a registered Trading System User. Network Address (303) stores the currently registered network address (in this case, an Ethernet MAC address) of the Network User Device. This is used for security purposes to help prevent unregistered Network User Devices from using the Network Resource Trading System (10). The User Description (304) field is used to enable the Network User Device operator to easily differentiate between multiple Network User Devices that they are managing. The Cash Balance UniqueID (305) is a unique identifier that acts as a key to an account stored in the Account Record Table (400), representing the Network User Device's Cash Balance (i.e. a balance placed on the account by conventional payment means, such as a credit card). The Shared Secret (306) is used as part of the authentication and decoding/encoding process when elements of Requests (40), Responses (60) and Notifications (80) are communicated between a Network User Device and other components. The Use Earned Balance (307) field is used by the System to determine whether any Earned Balance held by the owner of this Network User Device should be used 'First', 'Last' or 'Never' in settling charges for Network Resource Usage by this Network User Device via an Access Gateway. In the case of 'First', any earned balance is used ahead of any cash balance available for the Network User Device (i.e. it is trading Network Resources). In the case of 'Last', any cash balance would be used first. In the case of 'Never', only the cash balance would be used.

Sample Record (351)

| Reference | Field Description | Example Value |
|---|---|---|
| (301) | UniqueID | D38762348 |
| (302) | Owned by UniqueID | U673488 |
| (303) | Network Address | 00:F6:38:E3:65:C0 |
| (304) | User Description | Brad's WiFi PDA |
| (305) | Cash Balance UniqueID | 825343 |
| (306) | Shared Secret | Okj435879FksKllG |
| (307) | Use Earned Balance | First |

Account Record Table (400)

The Account Record Table contains information about each account balance tracked by the Network Resource Trading System (10). Each Account Record has its own Account UniqueID (401), which identifies it uniquely in the System. Each Account Record also has a single Owned by UniqueID (402), which identifies the UniqueID of the Account's owner. The Account Record may be owned by a registered Trading System User, a registered Network Resource Access Gateway or a registered Network Device. For a Trading System User, the Account Record may store either an Earned Balance or a Cash Balance. An Earned Balance is one where credits are made for provision of Network Resources, due to the Trading System User being an Access Gateway Operator. A Cash Balance is one where the Trading System User has used conventional payment means (credit card, cheque, bank transfer, etc.) to place a credit balance on his Account. For an Account Record owned by a Network Resource Access Gateway, the Balance (403) is always an Earned Balance. For an Account Record owned by a Network Device, the Balance (403) is always a Cash Balance. A date when the Balance Expires (404) is associated with each Account Record to ensure that unutilized accounts can be managed appropriately. Each Account Record keeps track of the aggregate value of all outstanding current Total Credit Reservations (405). This allows multiple Network Resource utilization sessions to be authorized by the Network Resource Trading System (10) at any one time, though with credit reserved for the maximum cost of each authorized session. It simplifies the checking of balances for new authorizations, as well as enabling the current total balance (i.e. Balance (403)+Total Credit Reservations (405)) to be calculated easily.

Sample Record 1 (451)

| Reference | Field Description | Example Value |
|---|---|---|
| (401A) | Account UniqueID | 1034243 |
| (402A) | Owned by UniqueID | U928378 |
| (403A) | Balance | 673.88 |
| (404A) | Balance Expires | 12:15:23, May 6, 2006 |
| (405A) | Total Credit Reservations | 0.00 |

Sample Record 2 (452)

| Reference | Field Description | Example Value |
|---|---|---|
| (401B) | Account UniqueID | 1034244 |
| (402B) | Owned by UniqueID | U928378 |

-continued

| Reference | Field Description | Example Value |
|---|---|---|
| (403B) | Balance | 0.00 |
| (404B) | Balance Expires | <Null> |
| (405B) | Total Credit Reservations | 0.00 |

Sample Record 3 (453)

| Reference | Field Description | Example Value |
|---|---|---|
| (401C) | Account UniqueID | 823134 |
| (402C) | Owned by UniqueID | U673488 |
| (403C) | Balance | 64.25 |
| (404C) | Balance Expires | 08:47:42, Apr. 19, 2006 |
| (405C) | Total Credit Reservations | 2.00 |

Sample Record 4 (454)

| Reference | Field Description | Example Value |
|---|---|---|
| (401D) | Account UniqueID | 823135 |
| (402D) | Owned by UniqueID | U673488 |
| (403D) | Balance | 0.00 |
| (404D) | Balance Expires | <Null> |
| (405D) | Total Credit Reservations | 0.00 |

Sample Record 5 (455)

| Reference | Field Description | Example Value |
|---|---|---|
| (401E) | Account UniqueID | 1034834 |
| (402E) | Owned by UniqueID | A2766274 |
| (403E) | Balance | 321.70 |
| (404E) | Balance Expires | 12:15:23, May 6, 2006 |
| (405E) | Total Credit Reservations | 0.00 |

Sample Record 6 (456)

| Reference | Field Description | Example Value |
|---|---|---|
| (401F) | Account UniqueID | 823169 |
| (402F) | Owned by UniqueID | A2128832 |
| (403F) | Balance | 1.25 |
| (404F) | Balance Expires | 08:47:42, Apr. 19, 2006 |
| (405F) | Total Credit Reservations | 0.00 |

Sample Record 7 (457)

| Reference | Field Description | Example Value |
|---|---|---|
| (401G) | Account UniqueID | 825343 |
| (402G) | Owned by UniqueID | D38762348 |
| (403G) | Balance | 5.00 |
| (404G) | Balance Expires | 21:22:18, May 9, 2006 |
| (405G) | Total Credit Reservations | 0.00 |

Session-in-Progress Table (500)

The Session-In-Progress Table contains information about each active (i.e. authenticated and authorized) session being tracked by the Network Resource Trading System (10), where Network Resources are being consumed by a Network User Device via an Access Gateway. Each Session-In-Progress has its own Session UniqueID (501), which identifies it uniquely in the System. The Session Timestamp (502) specifies the exact System time when the session commenced. The Network Device UniqueID (503) and the Access Gateway UniqueID (504) identify the Network User Device and Access Gateway respectively that are participating in the session. The Request Sequence Number (505) is a number submitted by an Access Gateway in a Request (40) to enable multiple sessions involving the same participants to be differentiated. The 1st Account UniqueID to Use (506) points to the Account in the Account Record Table (400) that is the first to be used to settle charges associated with this session. The 1st Account Credit Reservation (507) specifies the amount of the credit reservation that has been made on the 1st Account by the Network Resource Trading System (10) at session authorization time, such that the System can ensure that sufficient credit balance will be available on the Account at session termination time so as to settle charges correctly. The 2nd Account UniqueID to Use (508) points to the Account in the Account Record Table (400) that would be the second to be used to settle charges associated with this session, if required. The 2nd Account Credit Reservation (509) specifies the amount of the credit reservation that has been made on the 2nd Account by the Network Resource Trading System (10) at session authorization time, such that the System can ensure that sufficient credit balance will be available on the Account at session termination time so as to settle charges correctly if the 2nd Account is also required to be used. The Session-In-Progress record represents a temporary credit reservation; if the credit reservation is not utilized by the Time Credit Reservation Expires (510) then the record may be automatically expired and the Access Gateway involved in the session may no longer be assured payment.

Sample Record (551)

| Reference | Field Description | Example Value |
|---|---|---|
| (501) | Session UniqueID | 87465987456298376 |
| (502) | Session Timestamp | 17:14:10, May 14, 2005 |
| (503) | Network Device UniqueID | D38762348 |
| (504) | Access Gateway UniqueID | A2766274 |
| (505) | Request Sequence Number | 1357 |
| (506) | 1st Account UniqueID to Use | 823134 |
| (507) | 1st Account Credit Reservation | 1.25 |
| (508) | 2nd Account UniqueID to Use | 825343 |
| (509) | 2nd Account Credit Reservation | 0.75 |
| (510) | Time Credit Reservation Expires | 18:29:10, May 14, 2005 |

In one embodiment, Requests (40), Notifications (80) and Responses (60) are structured as data messages incorporating multiple data fields. These data messages may be transmitted over a network using any underlying transmission protocol, though using a reliable network protocol, such as TCP/IP, simplifies implementation. The data fields incorporated in Requests (40), Notifications (80) and Responses (60) in one embodiment are detailed below. There are many well-understood methods of encoding and transmitting/receiving these data fields as data messages; the details would depend on the implementer's specific requirements, though would have to take into account the requirement to be consistent with the formats, encodings and transmission protocols used by the Network Resource Access Gateway to communicate with the Network Resource Trading System.

Where secure hashes are referred to, any secure hash algorithm considered appropriate by the implementer may be used. In the sample data of the described embodiment, a 64 bit secure hash algorithm is used. For standards-compliance and higher levels of security, secure hash algorithms such as NIST's SHA-256 or SHA-512 algorithms would be preferable.

Request (40) for Authorization for Immediate Provision of Network Resources—Message Payload

| Reference | Data Value Description | Example Value |
|---|---|---|
| (50) | Protocol Identifier and Version | AA10 |
| (51) | Protocol Code | Request-Authorization |
| (52) | Protocol Code Type | First-Request |
| (53) | Request Sequence Number | 1357 |
| (54) | Access Gateway UniqueID | A2766274 |
| (55) | (e2) Access Gateway Address | 00:12:84:AE:C2:90 |
| (56) | (e1) Network Device UniqueID | D38762348 |
| (57) | (e2) Network Device Address | 00:F6:38:E3:65:C0 |
| (58) | Requested Authorization Period | 3600 |
| (59) | (s1) Secure-Hash | A6BC35E872BD8273 |

(e1) means the data value is encrypted using the Access Gateway's Shared Secret (e2) means the data value is encrypted using the Network Device's Shared Secret (s1) the Secure Hash is calculated using the Access Gateway's Shared Secret Response (60) to Authorization for Immediate Provision of Network Resources—Message Payload

| Reference | Data Value Description | Example Value |
|---|---|---|
| (70) | Protocol Identifier and Version | AA10 |
| (71) | Protocol Code | Response-Authorization |
| (72) | Protocol Code Type | Authorized |
| (73) | Request Sequence Number | 1357 |
| (74) | Session UniqueID | 87465987456298376 |
| (75) | Session Timestamp | 17:14:10, May 14, 2005 |
| (76) | Authorization Period | 3600 |
| (77) | (s1) Secure Hash | 7E56DB912738A60C |

(s1) the Secure Hash is calculated using the Access gateway's Shared Secret

Terminate-Session Notification (80)

| Reference | Data Value Description | Example Value |
|---|---|---|
| (90) | Protocol Identifier and Version | AA10 |
| (91) | Protocol Code | Terminate-Session |
| (92) | Protocol Code Type | First-Request |
| (93) | Session UniqueID | 87465987456298376 |
| (94) | Access Gateway UniqueID | A2766274 |
| (95) | Session Length | 1873 |
| (96) | (s1) Secure Hash | 9E7264C2BA7011F2 |

(s1) the Secure Hash is calculated using the Access Gateway's Shared Secret

Storage During Processing

Figure 3A:
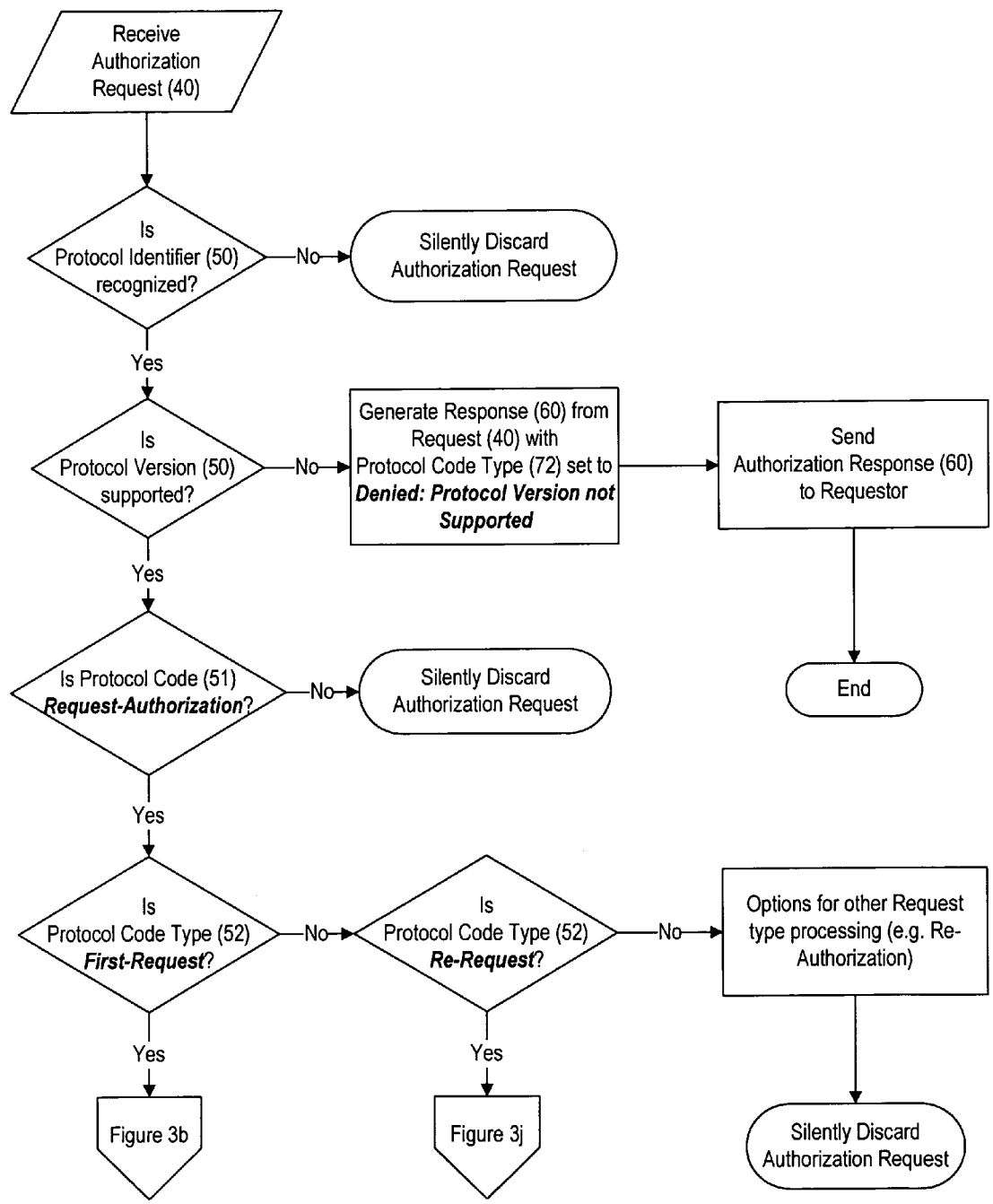
FIGS. 3$a$-3$v$ show the detailed method of operation of one embodiment of the invention within the Network Resource Trading System (FIG. 2), showing logic flows for processing Requests, Notifications and Responses.
Figure 3B:
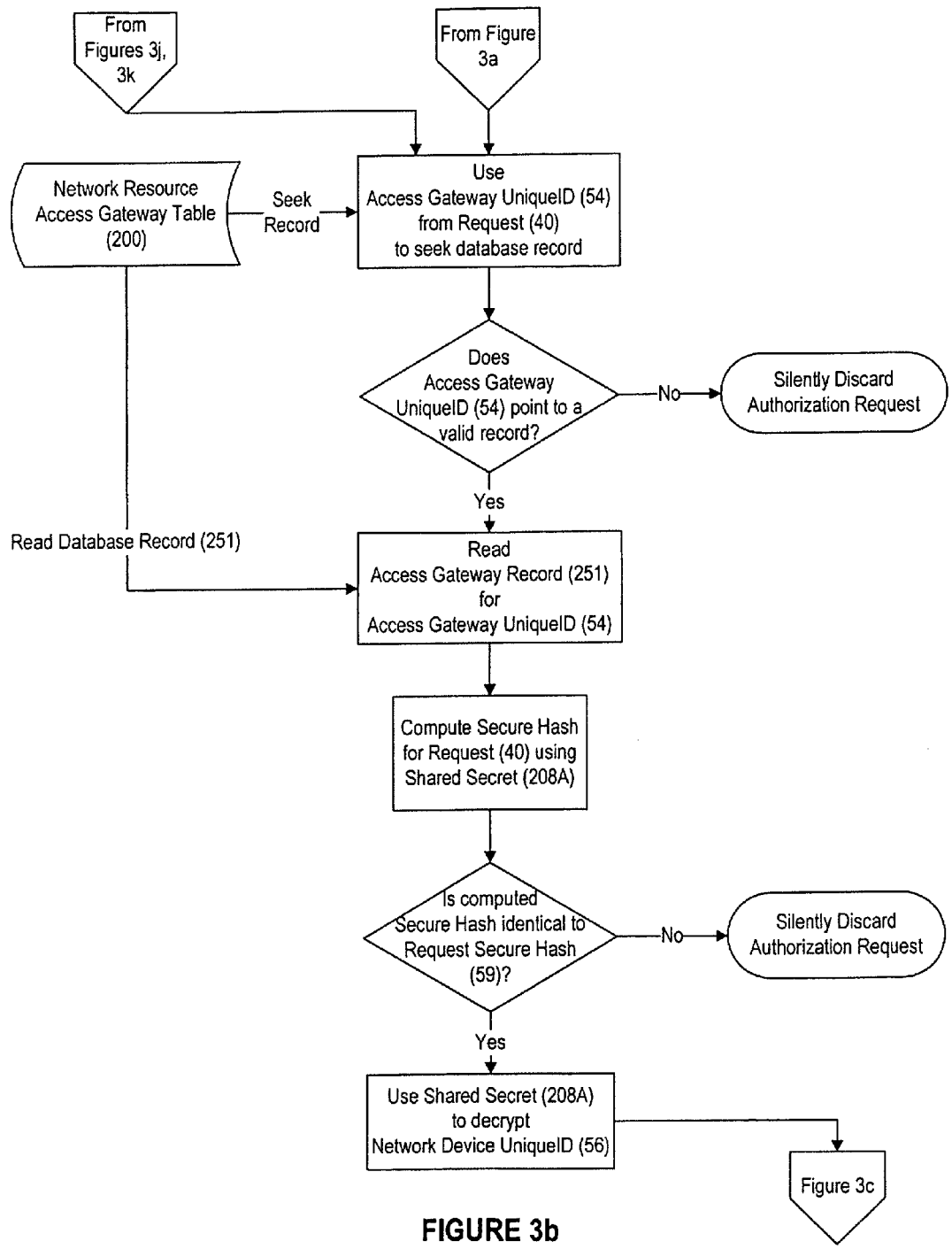
Figure 3C:
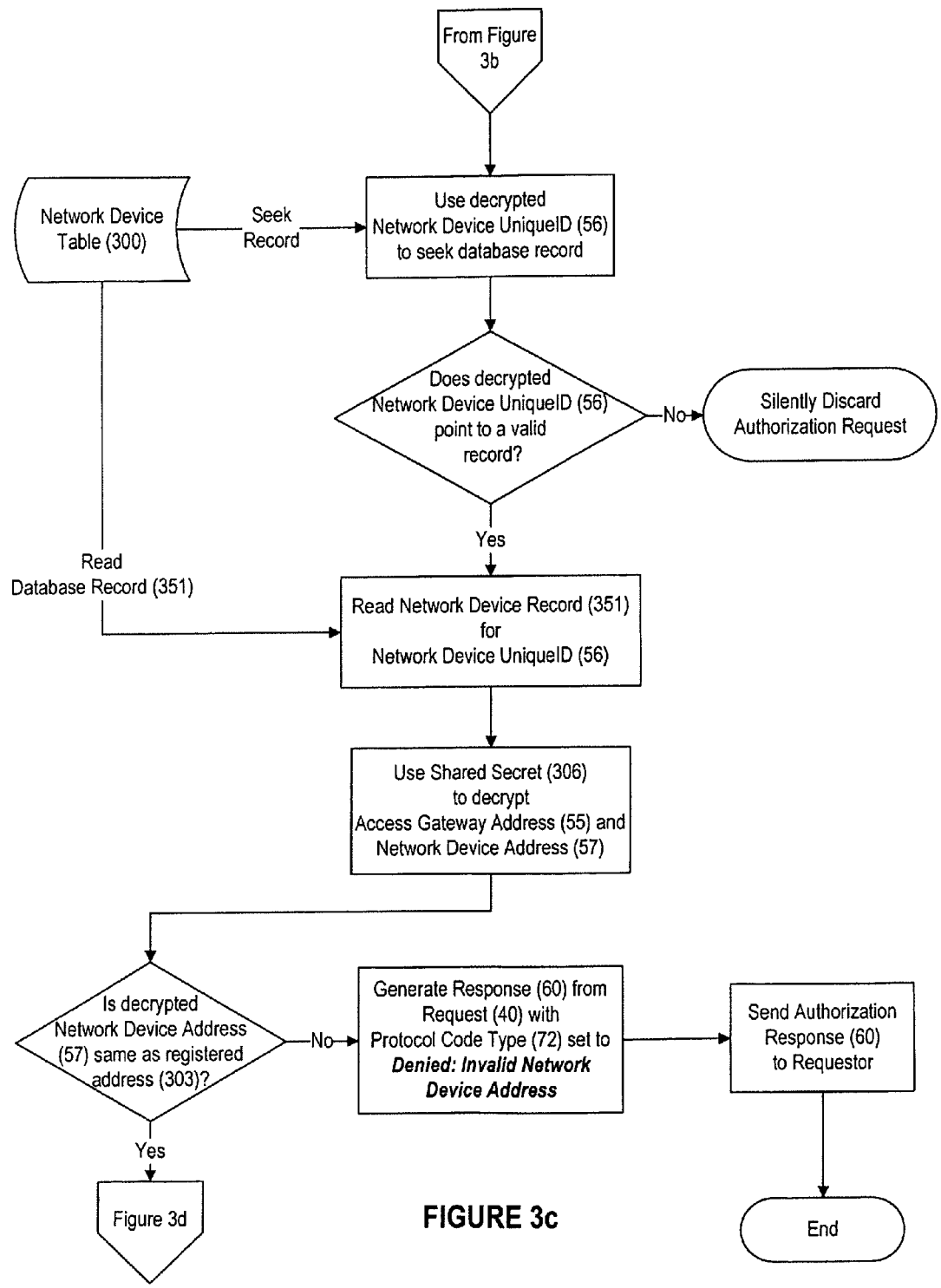
Figure 3D:
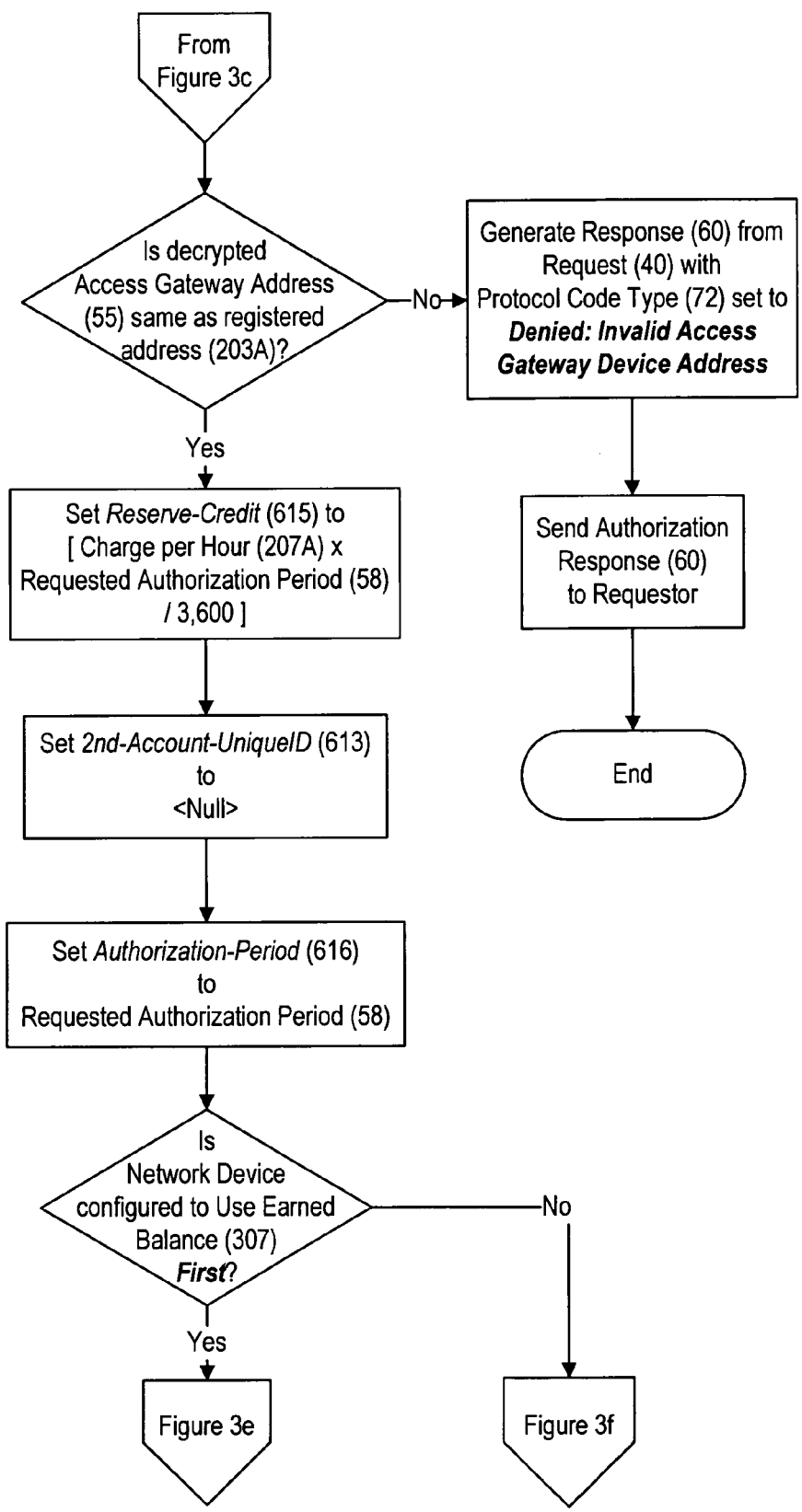
Figure 3E:
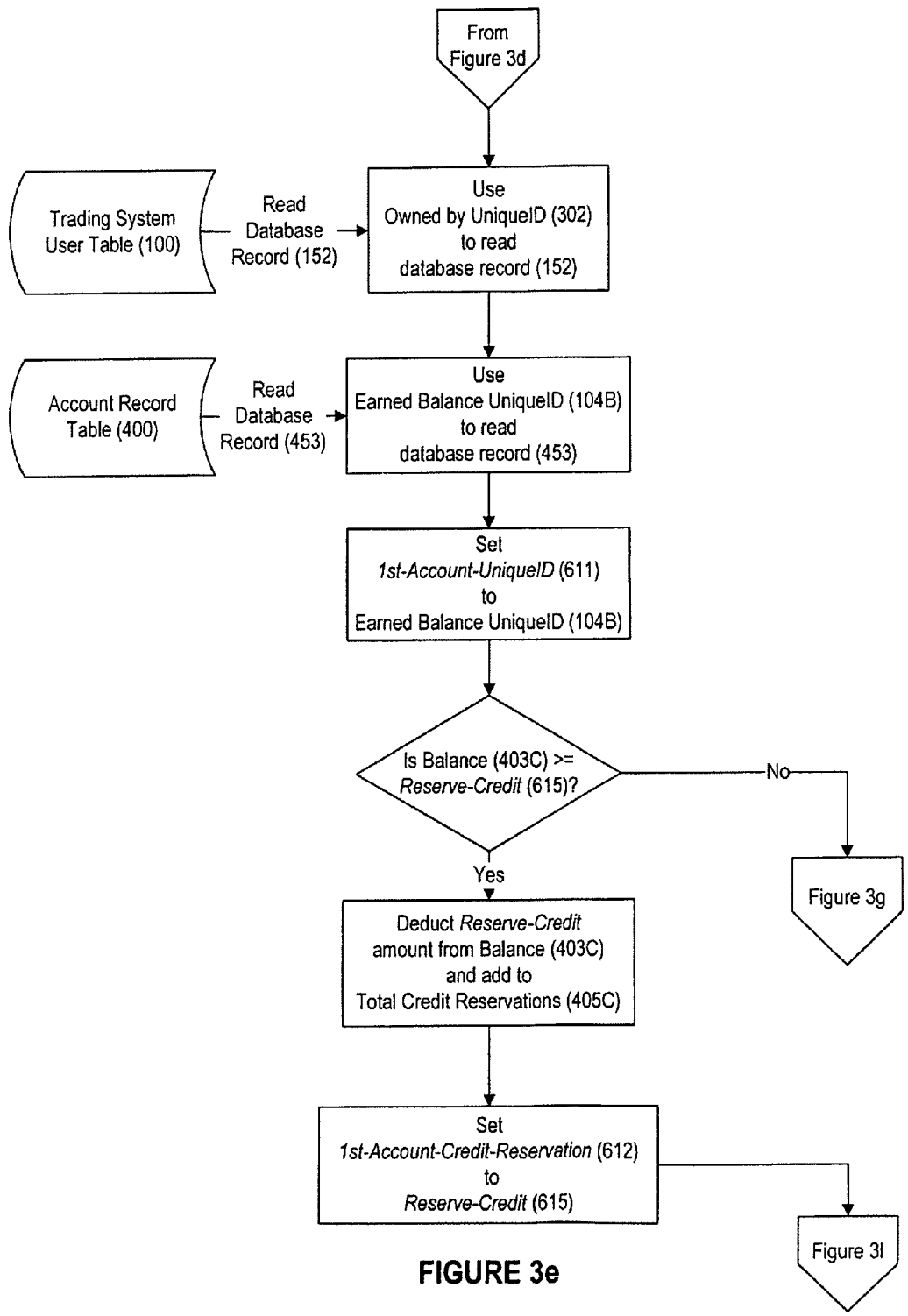
Figure 3F:
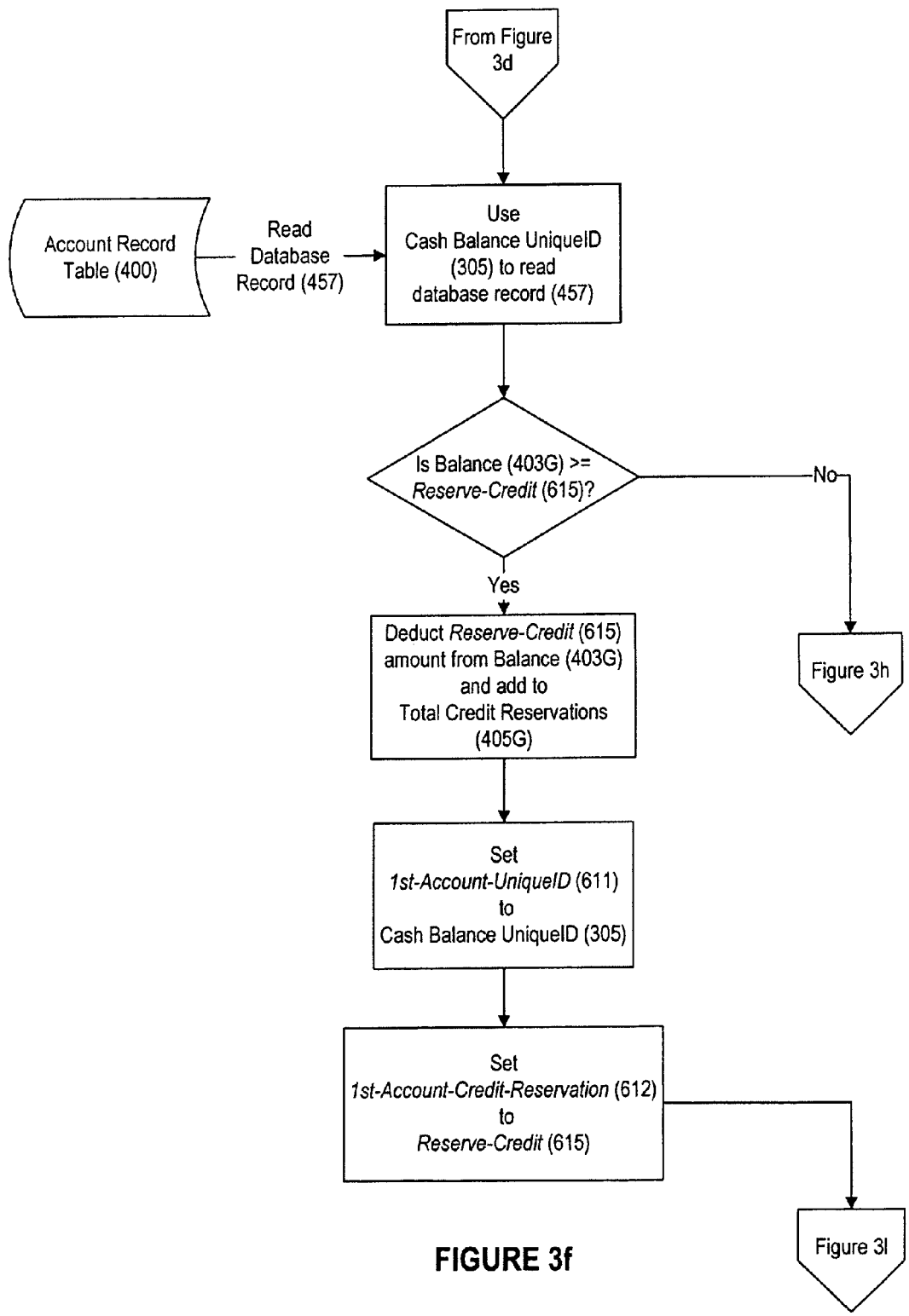
Figure 3G:
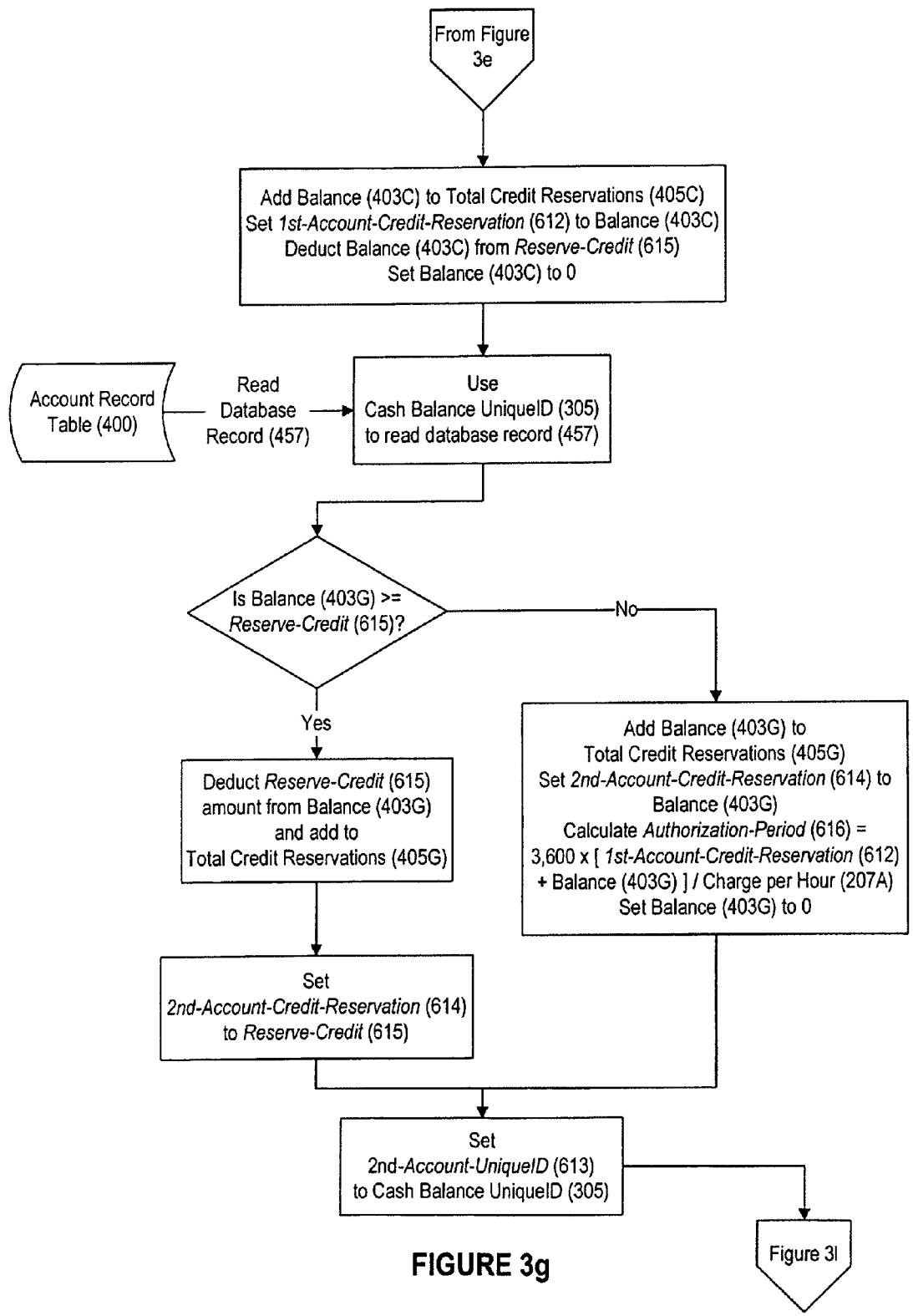
Figure 3H:
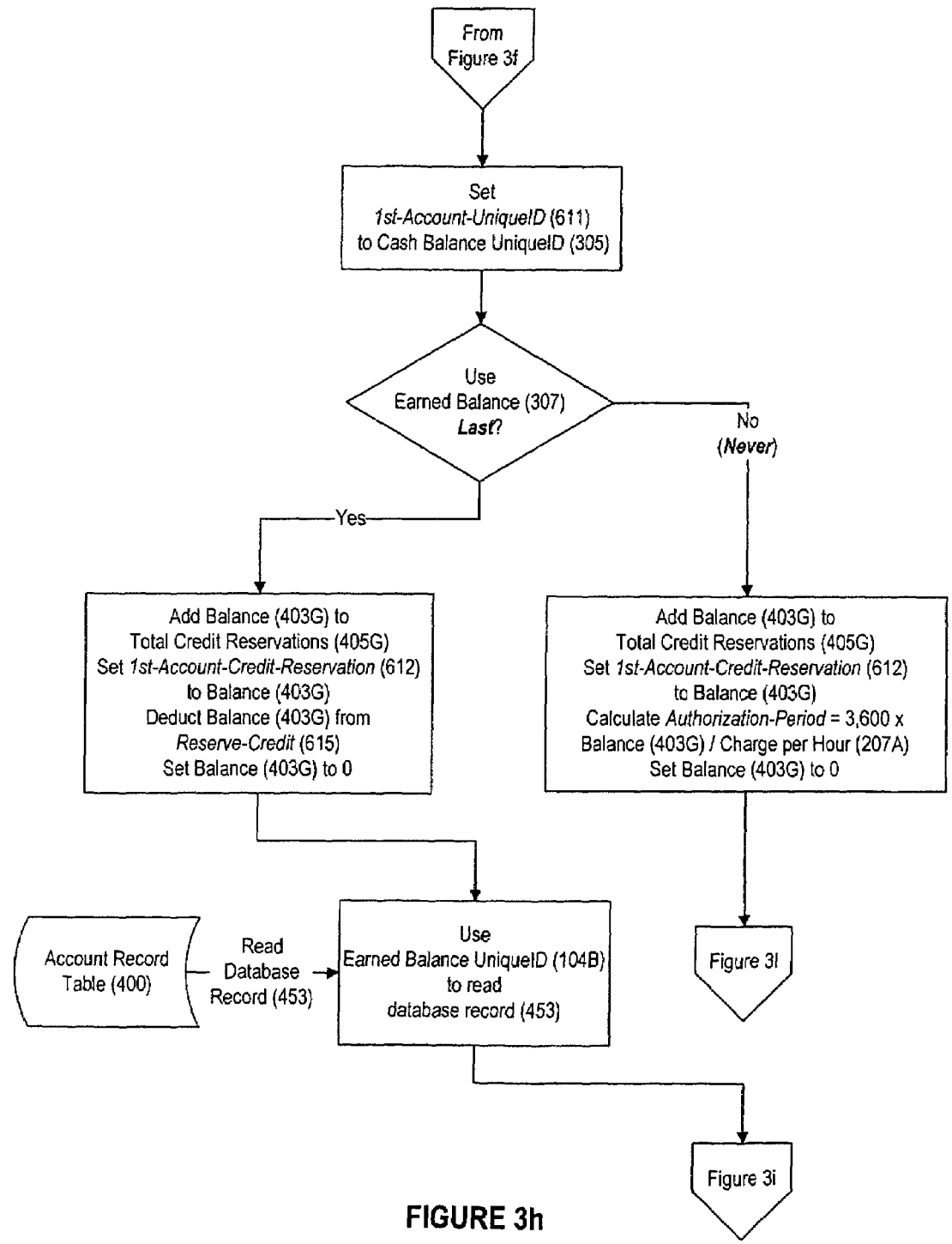
Figure 3I:
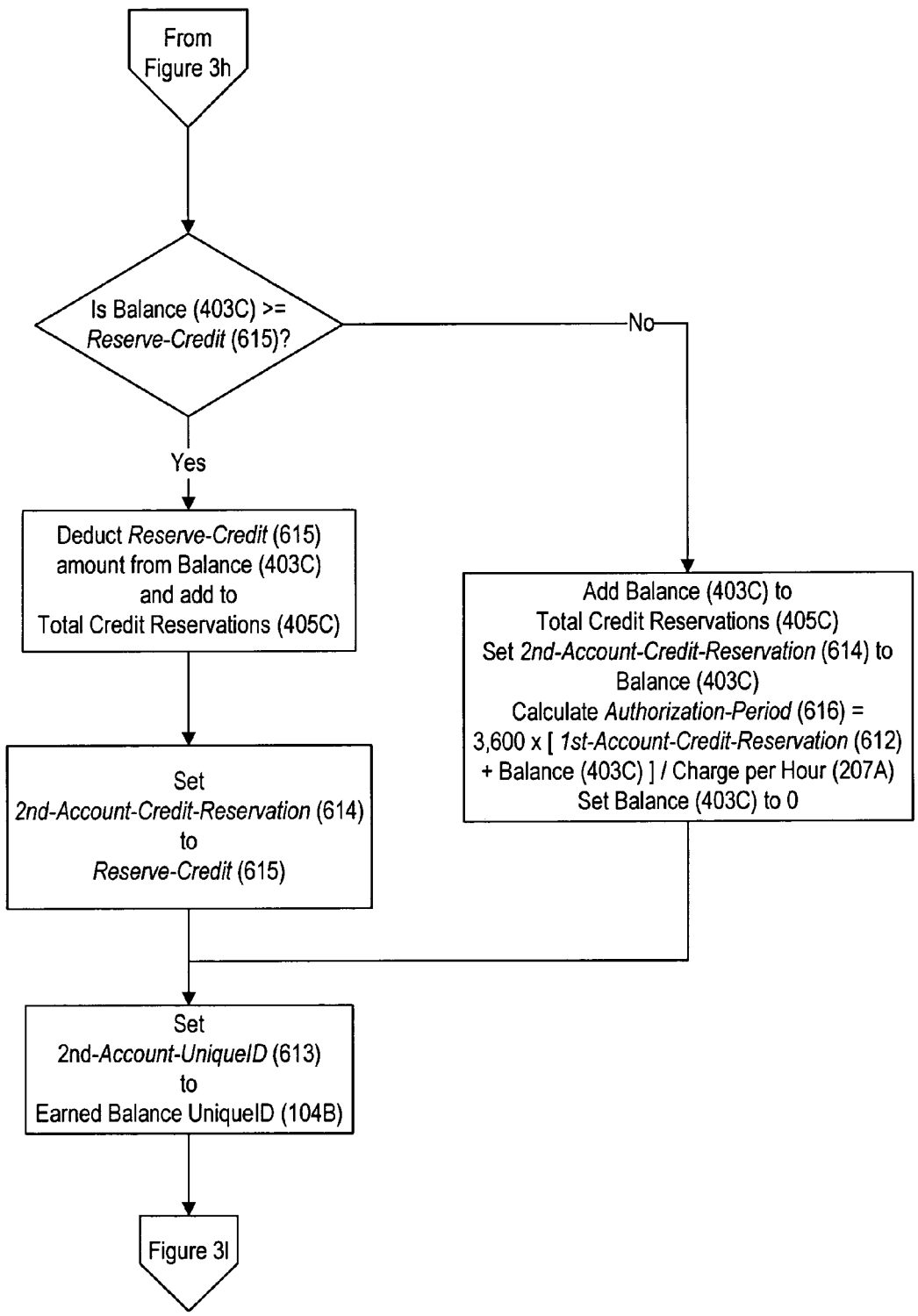
Figure 3J:
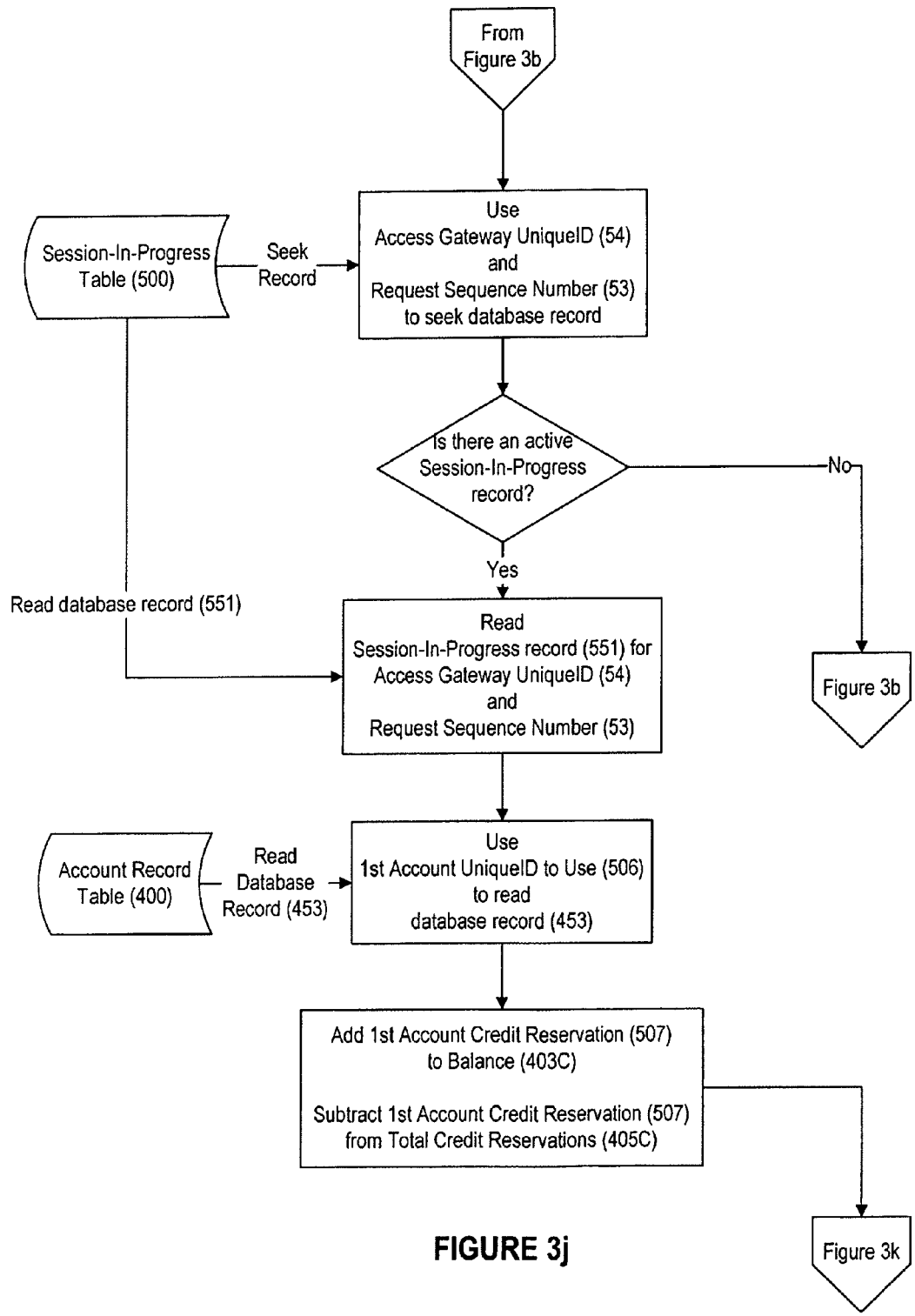
Figure 3K:
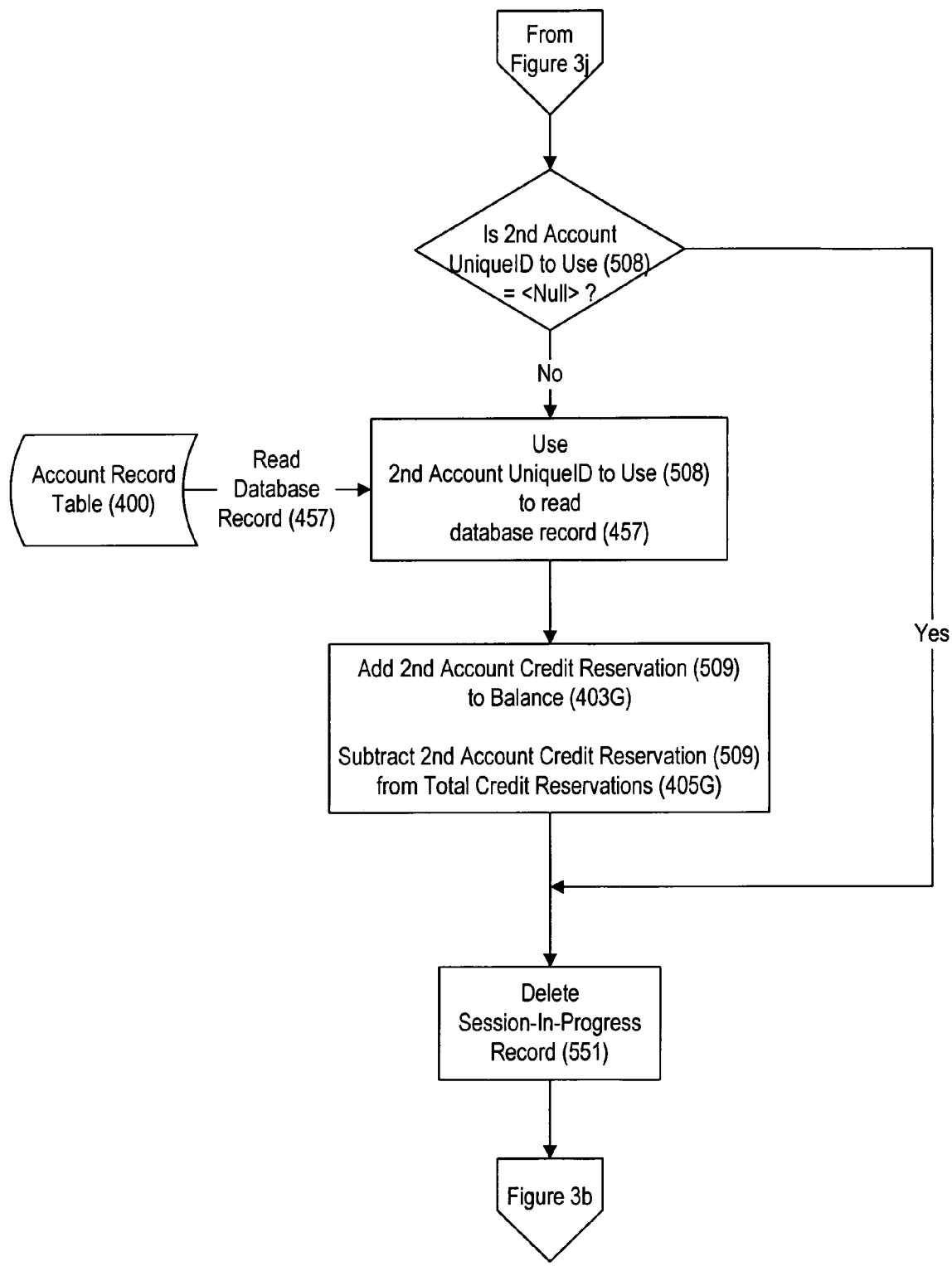
Figure 3L:
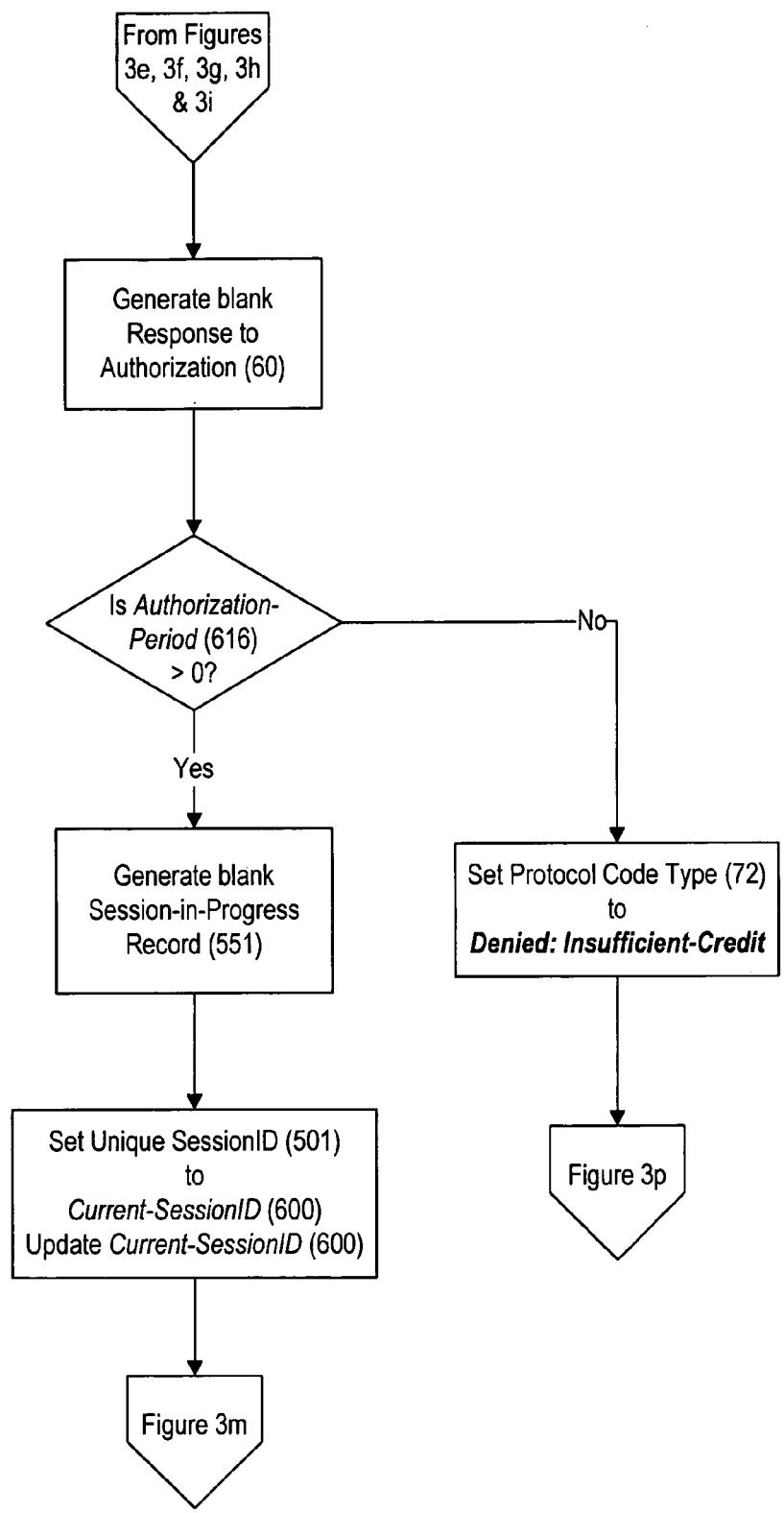
Figure 3M:
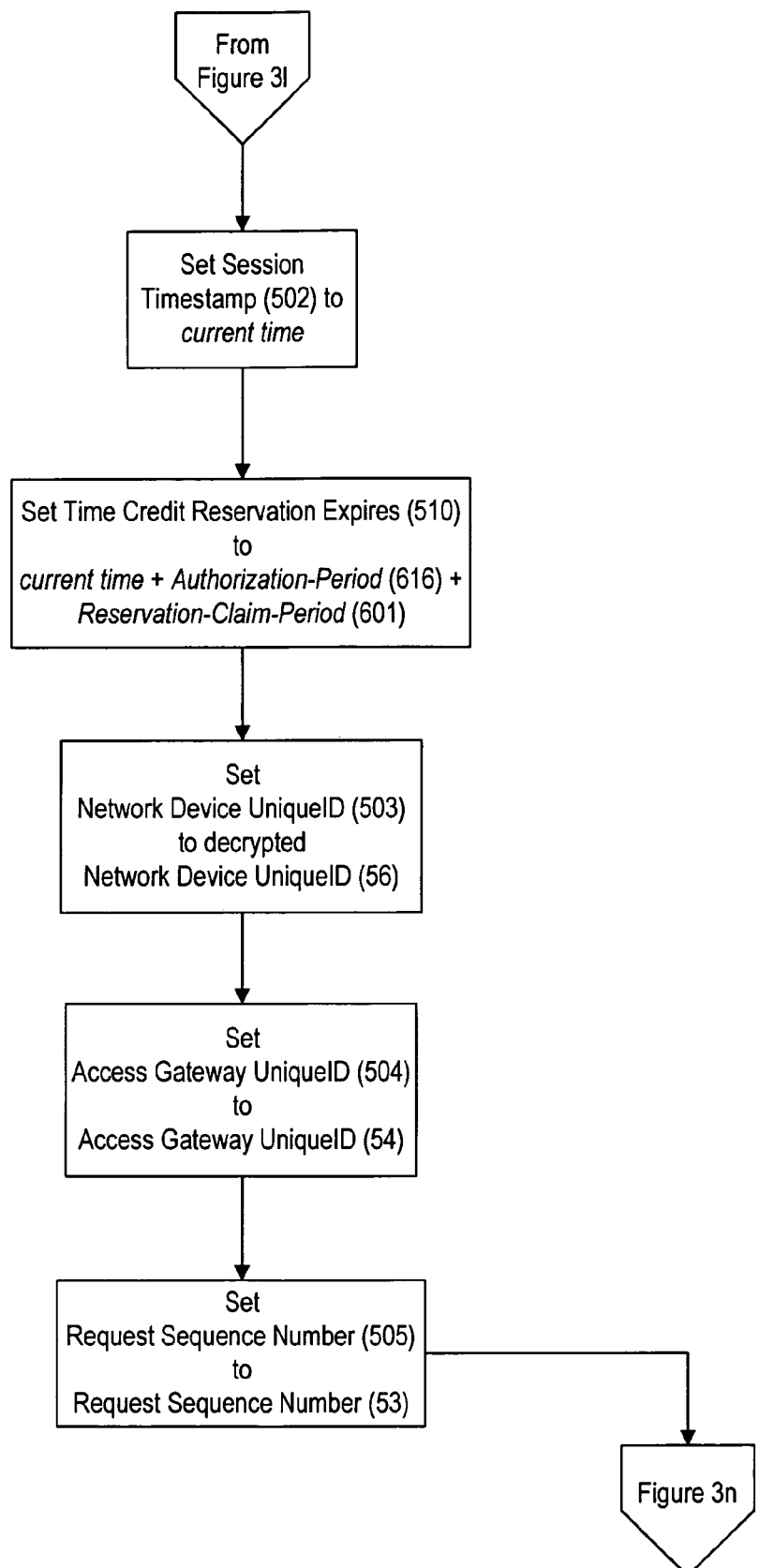
Figure 3N:
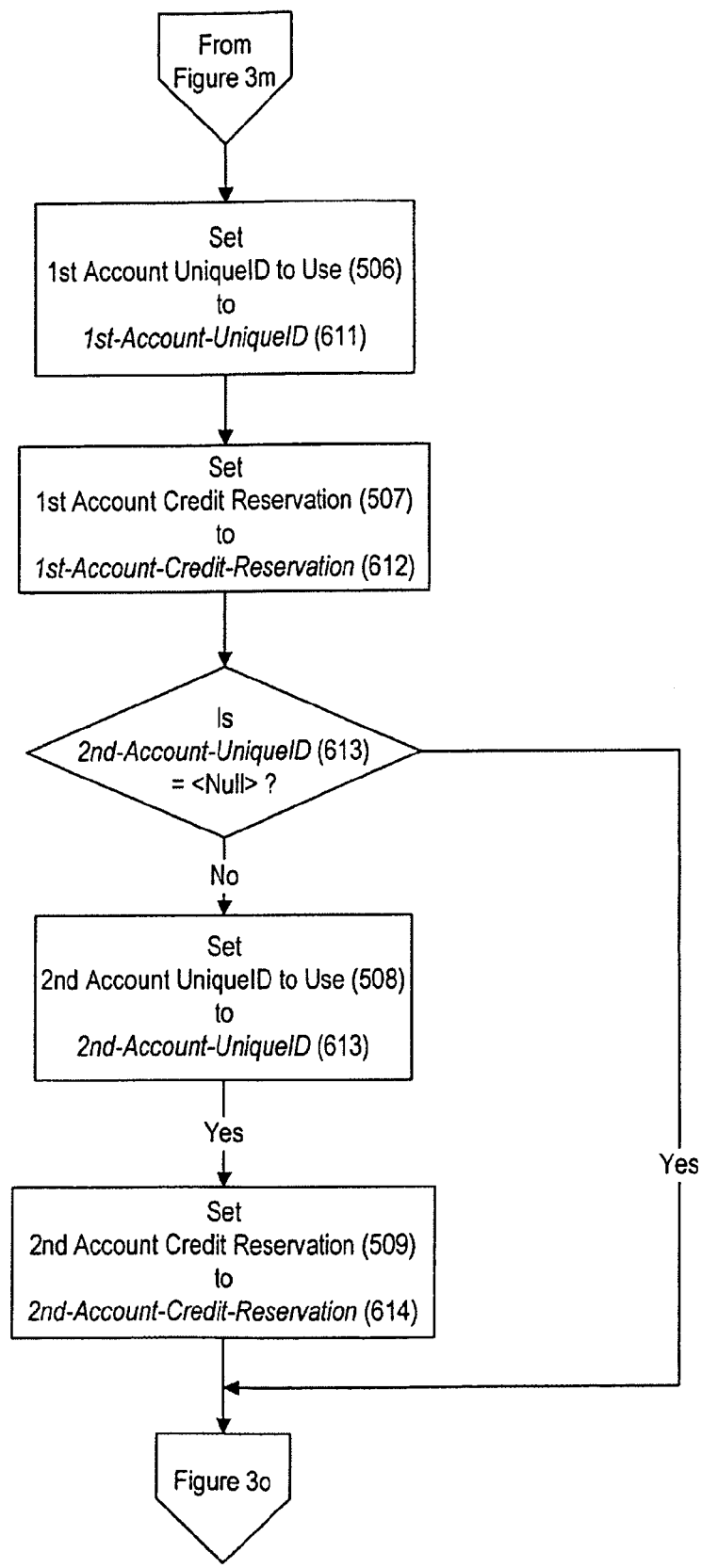
Figure 3O:
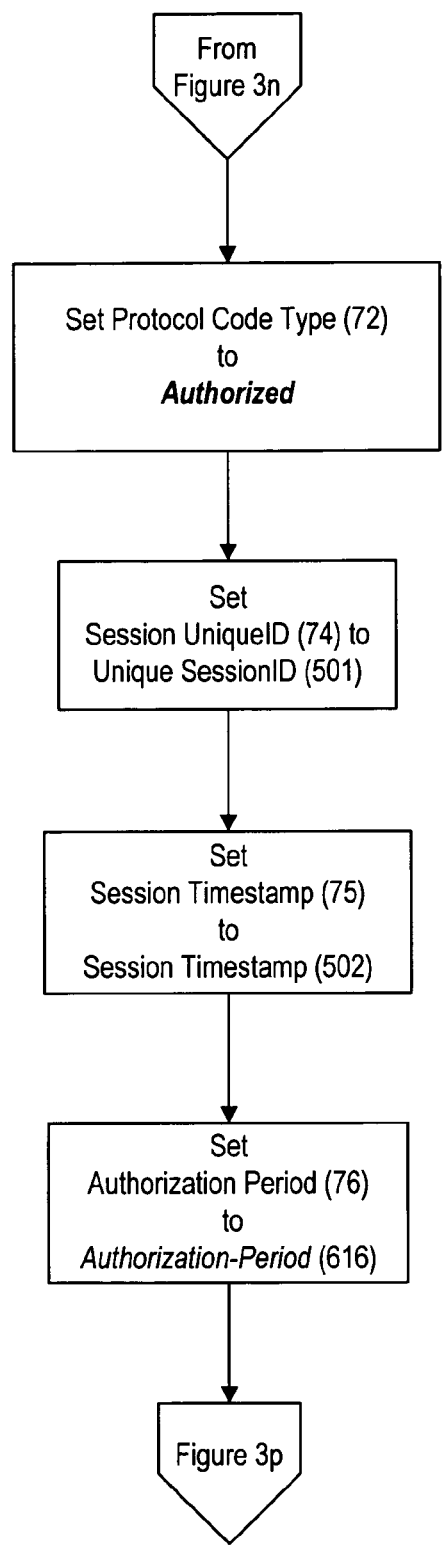
Figure 3P:
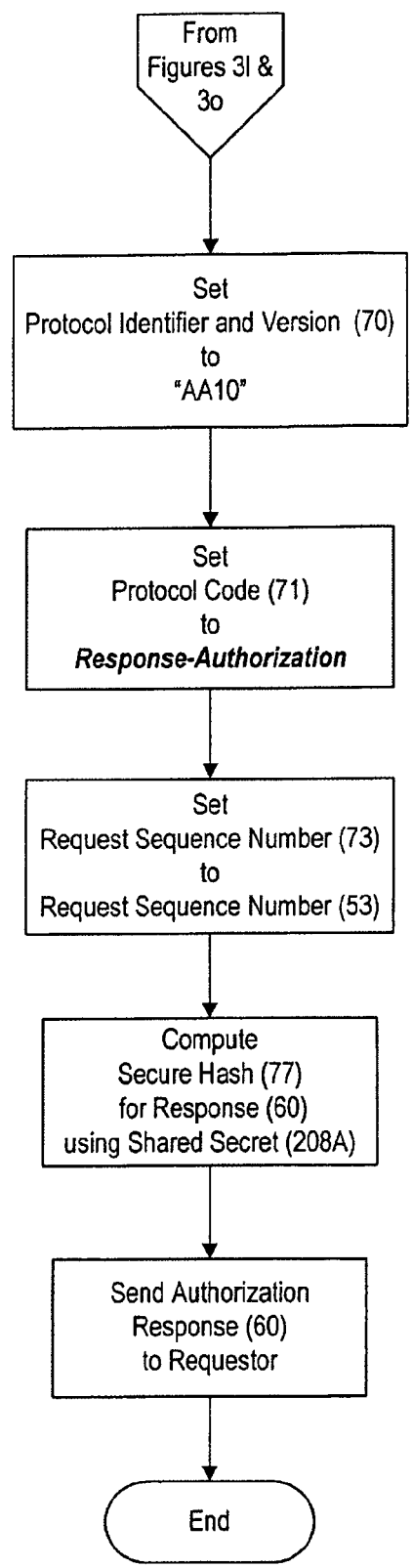
Figure 3Q:
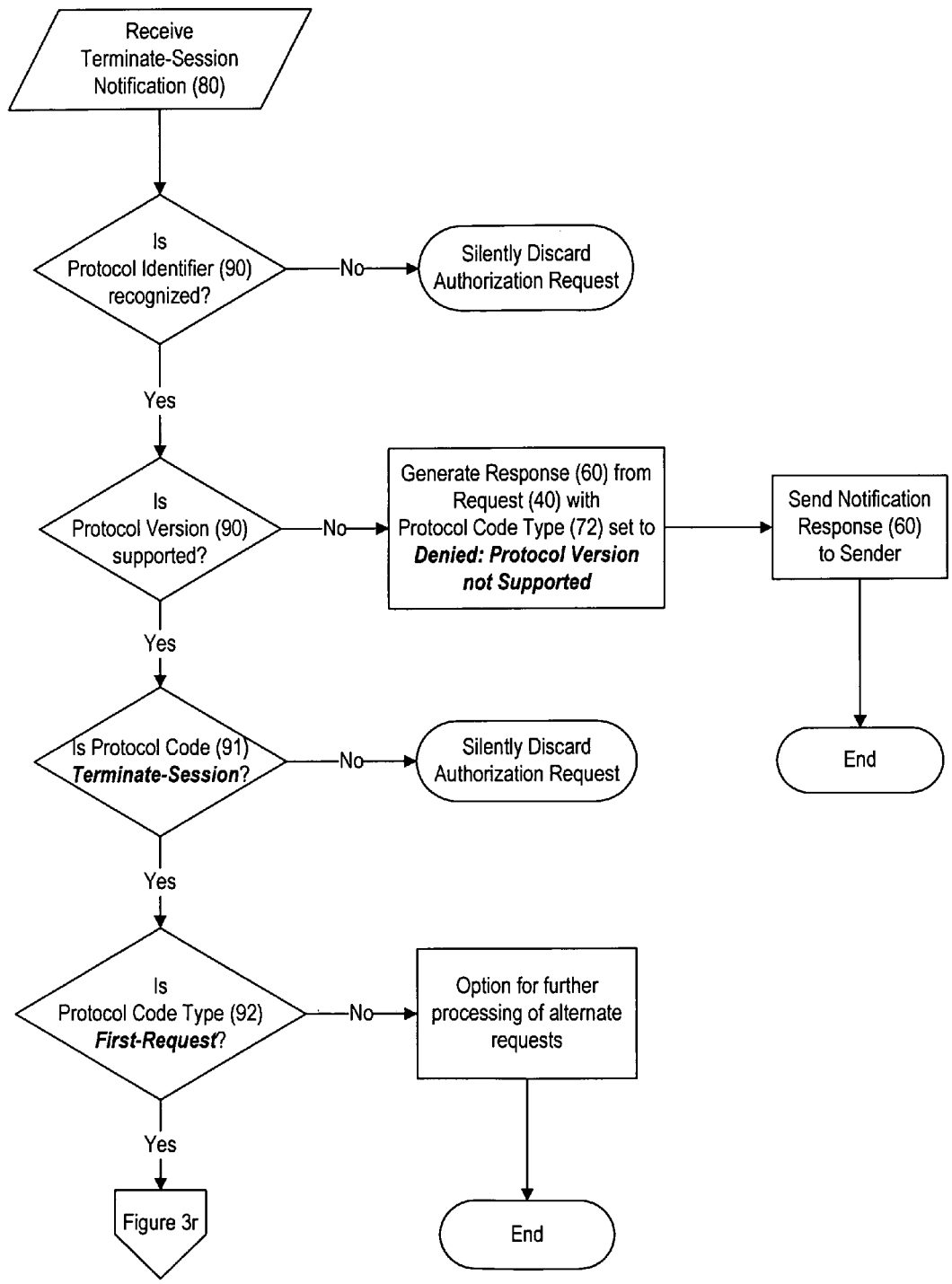
Figure 3R:
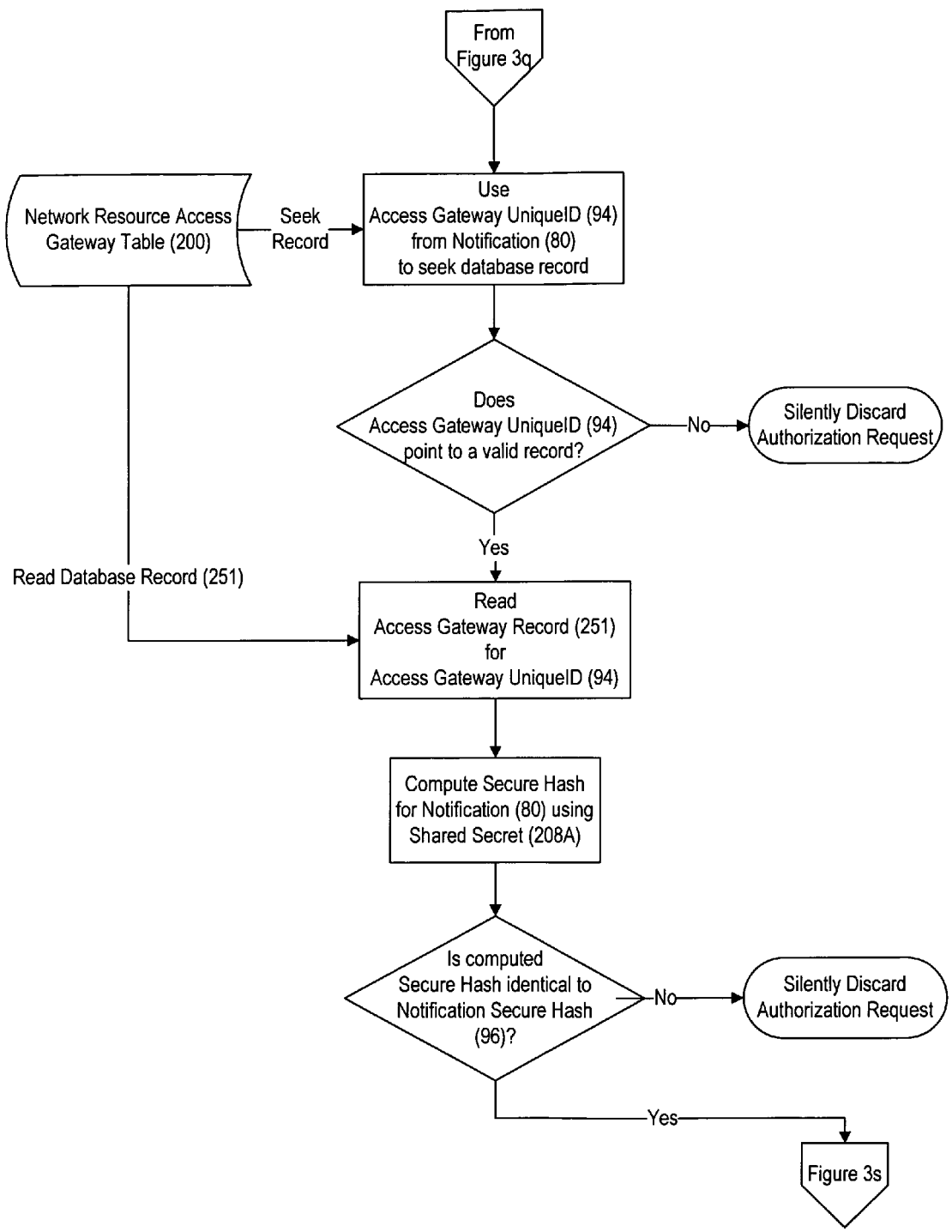
Figure 3S:
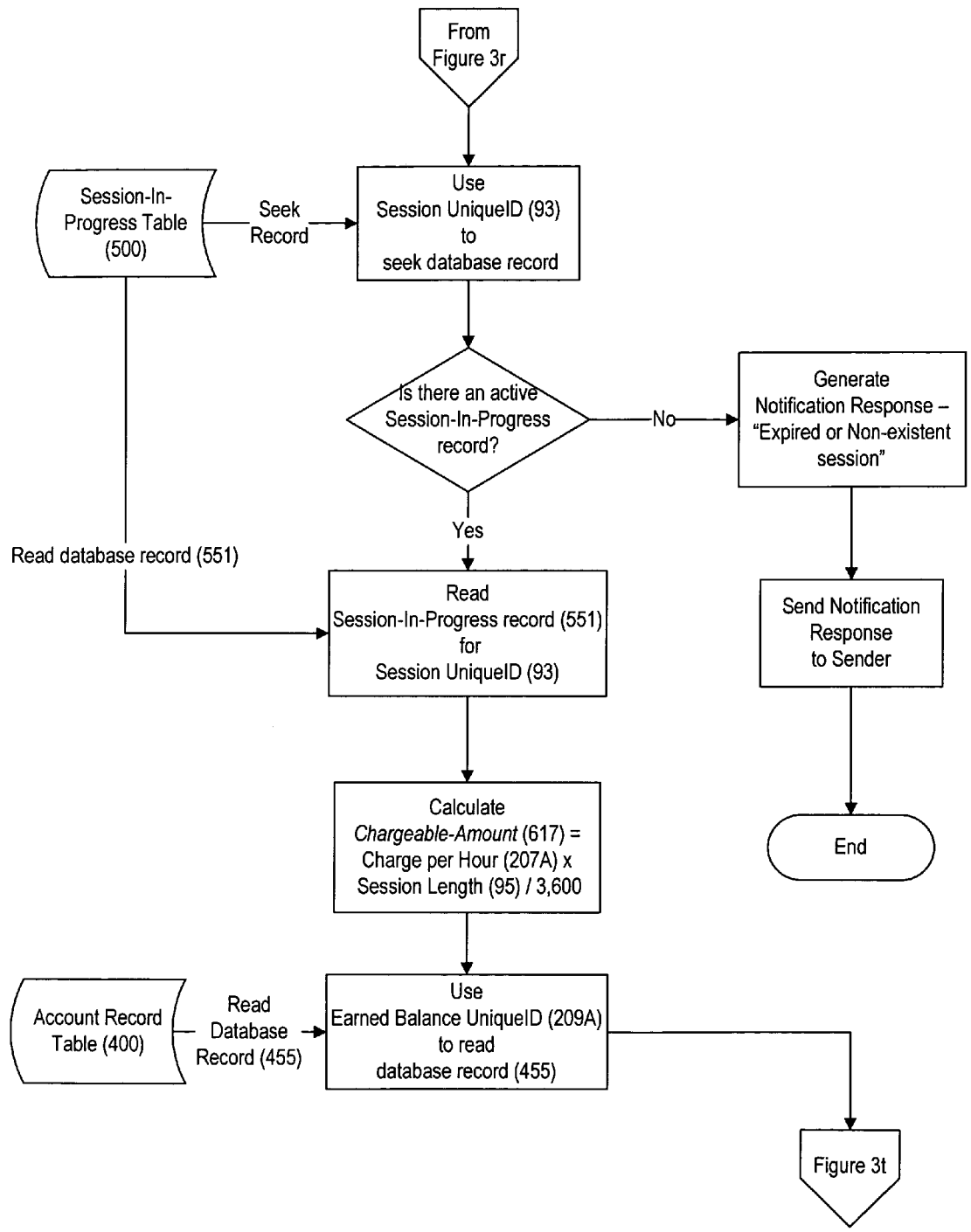
Figure 3T:
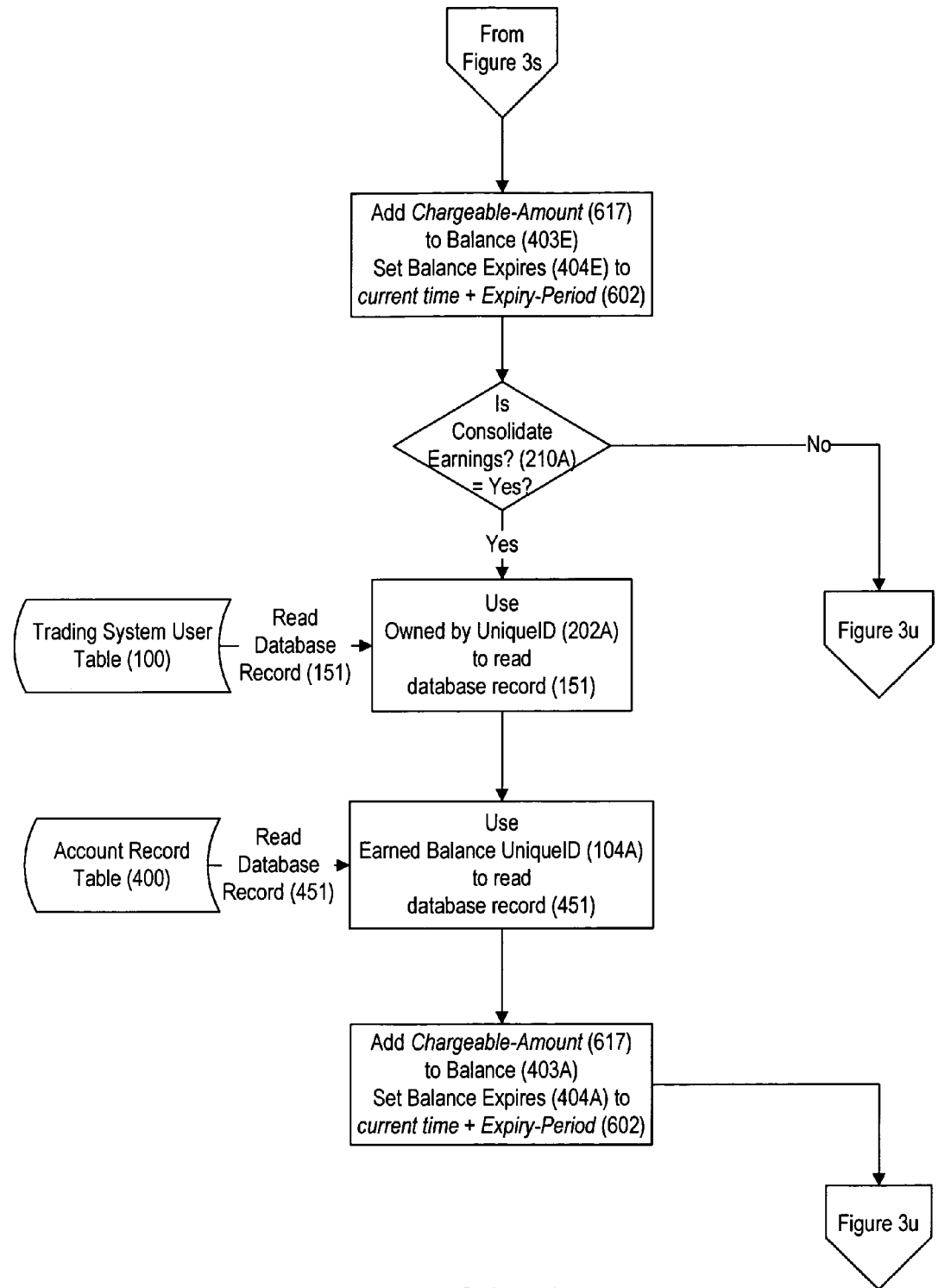
Figure 3U:
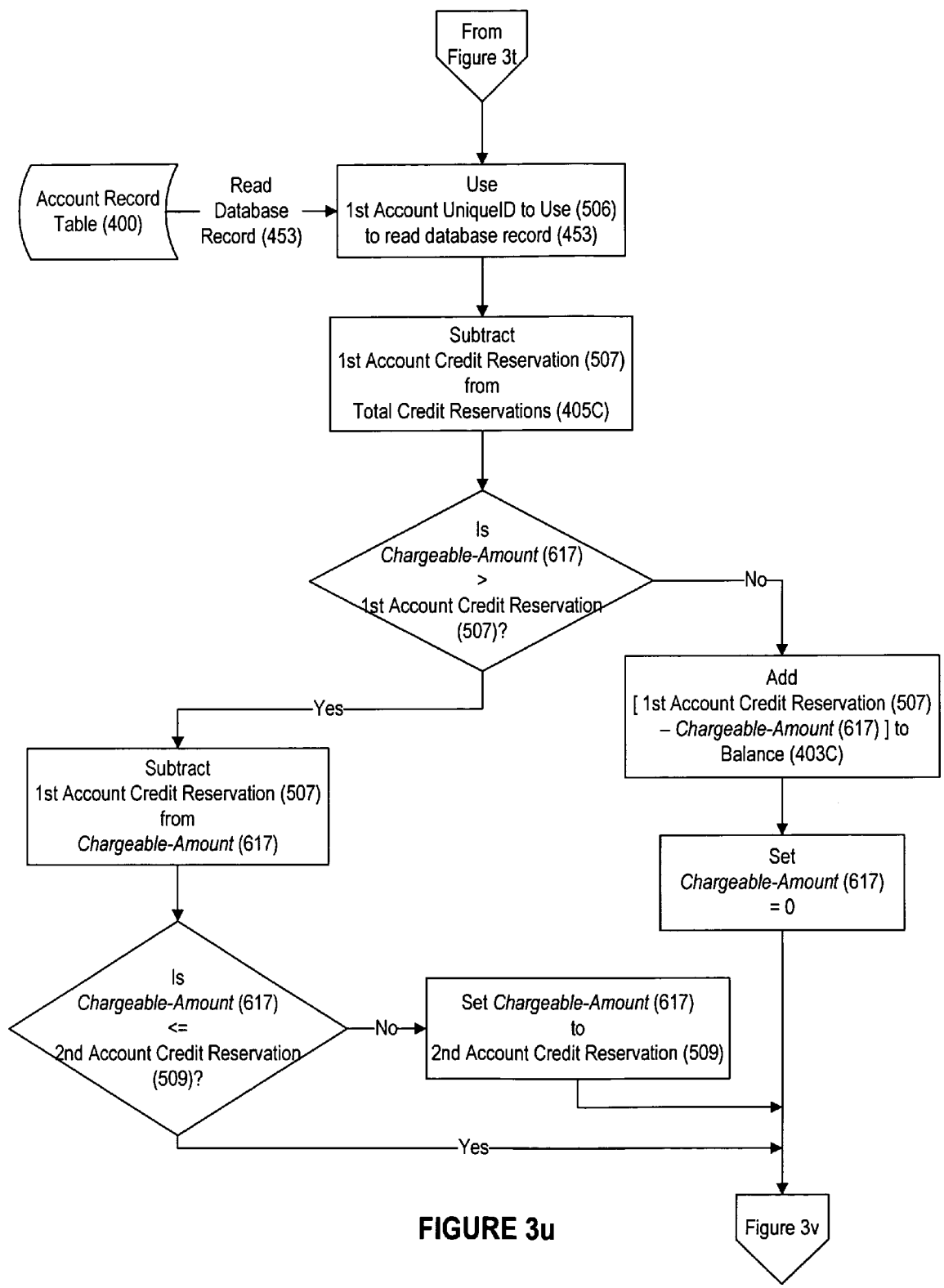
Figure 3V:
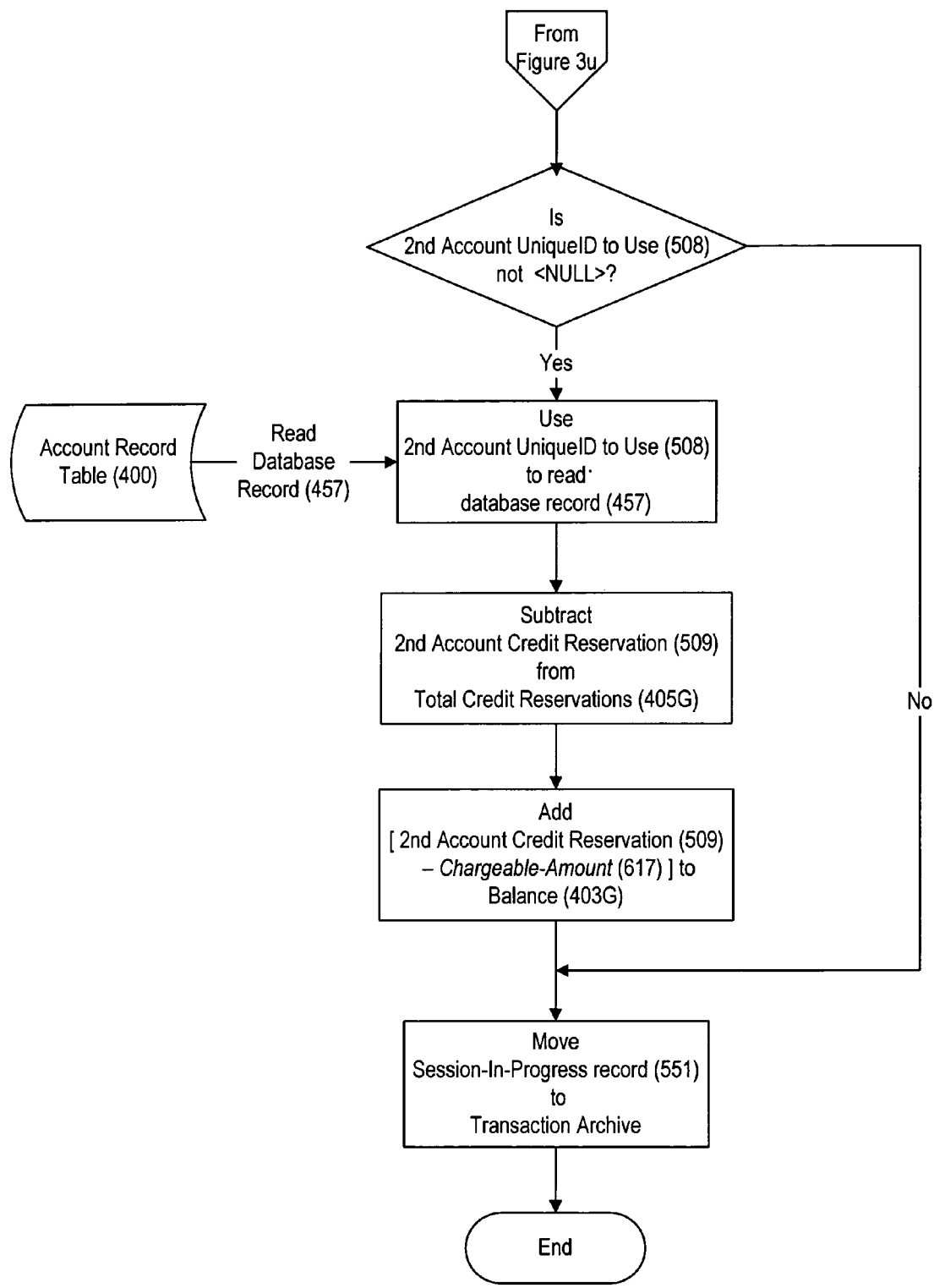

In the detailed description of the invention's method, illustrated by FIGS. 3a-3v, there are references to a number of values that are utilized in this embodiement. These are explained below:

Global Storage Descriptors, Required Throughout Lifetime of System Operation

These descriptors refer to values that are set by the implementer or operator of the invention prior to operation of the present invention's method. In some cases, the method updates the value (e.g. Current-SessionID is updated to the next incremental value). In implementation terms, they can be considered global variables.

| Reference | Field Description | Example Value |
|---|---|---|
| (600) | Current-SessionID | 87465987456298376 |
| (601) | Reservation-Claim-Period | 900 seconds |
| (602) | Expiry-Period | 1 year |

Local Storage Descriptors, Required for Duration of Process

These descriptors refer to temporary values that are required to be uniquely available and maintained for each operation of the method disclosed by the present invention. In implementation terms, they can be considered local variables. They need have no pre-defined values.

| Reference | Field Description | Example Value |
|---|---|---|
| (611) | 1st-Account-UniqueID | 0 |
| (612) | 1st-Account-Credit-Reservation | 0.00 |
| (613) | 2nd-Account-UniqueID | 0 |
| (614) | 2nd-Account-Credit-Reservation | 0.00 |
| (615) | Reserve-Credit | 0.00 |
| (616) | Authorization-Period | 0 |
| (617) | Chargeable-Amount | 0.00 |

Detailed Description of the Operation of one Embodiment of the Invention

The Processing Element (11) loads its Program Code into Memory (14) from Program Code Storage (13), set the values of its Global Storage Descriptors: Current-SessionID (600), Reservation-Claim-Period (601) and Expiry-Period (602) to their initiation values (chosen by the implementer) and starts execution of the loaded Program Code.

On receipt of a valid Request (40) by the Communications Element (15), the Request is transferred to the Processing Element (11).

FIGS. 3a and 3b

Referring first to FIGS. 3a and 3b, the Processing Element (11) receives the Authorization Request (40), which it must process as rapidly as possible, since the User of a Network User Device will usually be waiting to gain access to Network Resources (or to be denied access) and will generally only expect to wait between a fraction of a second and several seconds, at most, for a response. Processing of the Authorization Request (40) and return of the Response (60) must therefore be rapid to allow the Access Gateway to provide substantially immediate provision of Network Resources, as expected and anticipated by the User. Rapid processing is possible with the present invention since all data required for Request (40) processing and generation of the Response (60) is readily available at the time of processing, as described in this embodiment. Currently available standard commercial database software (such as Oracle, IBM's DB2 or Microsoft's SQLServer) and transaction-oriented processing systems (such as those sold by vendors such as Sun Microsystems or IBM) could be used as a platform for implementing this embodiment of the present invention and would allow all Request (40) processing and generation of a Response (60) to occur in a fraction of a second.

The Processing Element (11) first inspects the received Request (40) to confirm that it is valid. It starts by checking that the Protocol Identifier and Version (50) are recognized and supported by the current implementation of the Network Resource Trading System (10). In this embodiment, hex value AA is used to indicate that this is the Network Resource Trading Authorization and Accounting protocol and 10 specifies that it is version 1.0 of the protocol. An invalid value would result in a silent discard of the received Request (40) and an unsupported protocol version would result in a denial of service through a Response (60) being generated and returned to the sender, with the Protocol Code Type (72) set to Denied: Protocol Version not Supported. Secondly, the Processing Element (11) confirms that the Protocol Code (51) is a valid 'Request-Authorization' code. Multiple 'Request-Authorization' types may be supported by the implementation, as specified by the Protocol Code Type (52). A Protocol Code Type (52) of First-Request specifies that this is the first request sent by the sending Access Gateway requesting authorization for the specified Network Device for this session. A Protocol Code Type (52) of 'Re-Request' indicates that an earlier Request (40) from the Access Gateway was not responded to by the Network Resource Trading System (10). This may either be because it was not received or was invalid, or because the Response (60) was not successfully delivered to the Access Gateway within the expected time-frame. To ensure that the Network Resource Trading System (10) functions correctly, a 'Re-Request' must be processed separately and is detailed further below with reference to FIGS. 3j and 3k. Other Protocol Code Types (52) may be used when requiring follow-on authorization for an existing session (e.g. to extend the time period for an existing authorization). How any additional Protocol Code Types (52) are handled is the responsibility of the implementer. Unrecognized Protocol Code Types (52) are silently discarded.

The Processing Element (11) uses the Access Gateway UniqueID (54) contained within the Request (40) to seek a corresponding record in the Network Resource Access Gateway Table (200), which is read from Database Storage (12). The Access Gateway UniqueID (54) uniquely identifies each Access Gateway registered with the Network Resource Trading System (10). If the Access Gateway UniqueID (54) does not correspond to a valid record, the Request (40) is silently discarded, as it is potentially a fraudulent Request (40). If the Access Gateway UniqueID (54) points to a valid record, the Processing Element (11) reads the Access Gateway Record (251) and retrieves the current Shared Secret (208A) for the specified Access Gateway UniqueID (54). It uses the Shared Secret (208A) to compute the secure hash of the entire data payload of the received Request (40), excluding the Secure Hash value (59). It compares the computed value with the Secure Hash value (59) received in the Request (40). If the values are not identical, there may have been tampering with the data in the received Request (40), so the Processing Element (11) silently discards the Request. Otherwise, the Processing Element (11) uses the Shared Secret (208A) to decrypt the Network Device UniqueID (56) contained within the Request (40). The Network Device UniqueID (56) is encrypted within the Request (40) to reduce the amount of information that might be available to an eavesdropper monitoring the connection between the Access Gateway and Network Resource Trading System (10).

FIGS. 3c and 3d

Referring now to FIGS. 3c and 3d, the Processing Element (11) uses the decrypted Network Device UniqueID (56) to seek a corresponding record in the Network Device Table (300), which is read from Database storage (12). The Network Device UniqueID (56) uniquely identifies each Network Device registered with the Network Resource Trading System (10). If the Network Device UniqueID (56) does not correspond to a valid record, the Request (40) is silently discarded, as it implies a potentially fraudulent Request (40) has been fabricated by the Access Gateway. If the Network Device UniqueID (56) points to a valid record, the Processing Element (11) uses it to read the relevant Network Device Record (351) and retrieves the current Shared Secret (306) for the specified Network Device UniqueID (56). It uses the Shared Secret (306) to decrypt the Access Gateway Address (55) and the Network Device Address (57) contained in the Request (40). These values are then checked against their corresponding registered values of Network Device Address (303) and Access Gateway Address (203A), which are retrieved from the Network Device Record (351) and Access Gateway Record (251) respectively. If either value is invalid, it suggests that the hardware in use is unregistered, resulting in a denial of service through a Response (60) being generated and returned to the Requestor (i.e. originating Access Gateway), with the Protocol Code Type (72) set to the appropriate cause, either Denied: Invalid Network Device Address or Denied: Invalid Access Gateway Device Address. Reasons for invalid network addresses include: different hardware in use or a change by the hardware administrator of its low-level network address. Either represents a potential security risk, so is disallowed until the correct network address is registered.

The Processing Element (11) uses the registered Access Gateway's Charge per Hour (207A) and the Requested Authorization Period (58) to calculate the value of credit that must be available to satisfy the Request (40). The Requested Authorization Period is in seconds. A calculated amount is stored temporarily: Reserve-Credit (615)=(Requested Authorization Period×Charge per Hour)/3,600 (=2.00 for the sample data). This embodiment of the invention uses credit reservation for authorizing Network Resource usage, to ensure that only a volume of Network Resource usage that can be settled by a sufficient credit balance of the Network Device User is authorized. Temporary storage values for 2nd-Account-UniqueID (613) and Authorization-Period (616) are set.

A central element of the invention is allowing credit balances earned through providing access to Network Resources via an Access Gateway to be traded for access to Network Resources when the same owner/operator uses one of their Network Devices to access Network Resources via a different owner/operator's Access Gateway. In this embodiment of the invention, which provides broad flexibility for the Network Device User, each Network Device can be configured to use an Earned Balance i) First, ii) Last or iii) Never. This allows an Earned Balance to be used in conjunction with a Cash Balance for those times when the Network Device User has insufficient earned credit available to trade for access to the required Network Resources.

The Processing Element (11) uses the Network Device Record's (351) Use Earned Balance (307) field to determine whether the Earned Balance should be used First. If not (i.e. Last or Never), the description of operation continues as described below with reference to FIG. 3f.

FIG. 3e

As shown in FIG. 3e, since a Network Device has no Earned Balance of its own, it must use the Earned Balance of its owner, a Trading System User. The Trading System User's Record (152) is read from Database Storage (12) using the Owned by UniqueID (302) as the lookup key. The Trading System User's Earned Balance UniqueID (104B) is then used as the key to read the Account Record (453) from Database Storage (12).

For the credit reservation facility, the first Account Record that will be used for credit reservation is the Trading System User's Earned Balance. The temporary storage value for 1st-Account-UniqueID (611) is therefore set to Earned Balance UniqueID (104B).

The Processing Element (11) must determine whether there is sufficient credit available in the Trading System User's Earned Balance to reserve for the requested Network Resource authorization. If the Balance (403C) is not greater than or equal to the Reserve-Credit (615) amount, then there is insufficient credit and a further account must be used for credit reservation, so processing continues as described below with reference to FIG. 3*g*. Otherwise, there is sufficient credit available and the Reserve-Credit (615) amount is deducted from the Account's Balance (403C) and added to the Total Credit Reservations (405C) for the Account. The temporary storage value for 1st-Account-Credit-Reservation (612) is set to the amount of the total amount of credit that must be reserved for this Request (40), the Reserve-Credit (615) amount.

Processing continues with formulation of the Response (60) as described below with reference to FIGS. 3*l* and 3*m*.

FIG. 3*f*

FIG. 3*f* describes the processing to make a credit reservation when a Network Device is configured not to use the Earned Balance First (i.e. Cash Balance must be used first).

The Network Device's Cash Balance UniqueID (305) is used as the key to read the Account Record (457) from Database Storage (12).

The Processing Element (11) must determine whether there is sufficient credit available in the Network Device's Cash Balance to reserve for the requested Network Resource authorization. If the Balance (403G) is not greater than or equal to the Reserve-Credit (615) amount, then there is insufficient credit and a further account must be used for credit reservation, so processing continues as described below with reference to FIGS. 3*h* and 3*i*. Otherwise, there is sufficient credit available and the Reserve-Credit (615) amount is deducted from the Account's Balance (403G) and added to the Total Credit Reservations (405G) for the Account.

For the credit reservation facility, the first Account Record that will be used for credit reservation is the Network Device's Cash Balance. The temporary storage value for 1st-Account-UniqueID (611) is therefore set to Cash Balance UniqueID (305).

The temporary storage value for 1st-Account-Credit-Reservation (612) is set to the amount of the total amount of credit that must be reserved for this Request (40), the Reserve-Credit (615) amount.

Processing continues with formulation of the Response (60) as described below with reference to FIGS. 3*l* and 3*m*.

FIG. 3*g*

FIG. 3*g* describes the processing to make a credit reservation when the Network Device is configured to use the Earned Balance First but there is insufficient credit balance in the Account, so a reservation must also be made on the Cash Balance Account.

The total amount of the Earned Balance (403C) is added to the Total Credit Reservations (405C). The temporary storage value for 1st-Account-Credit-Reservation (612) is set to the Earned Balance (403C). The Earned Balance (403C) is deducted from the Reserve-Credit (615) amount to leave the amount that must be reserved from the Cash Balance. The Earned Balance (403C) is set to 0. The Network Device's Cash Balance UniqueID (305) is used as the key to read the Account Record (457) from Database Storage (12).

The Processing Element (11) must determine whether there is sufficient credit available in the Network Device's Cash Balance to reserve for the remaining required period of Network Resource authorization. If the Balance (403G) is not greater than or equal to the Reserve-Credit (615) amount, then there is insufficient credit and the Requested-Authorization-Period (58) of the Request (40) cannot be satisfied and a reduced Authorization Period must be calculated as follows: The total amount of the Network Device's Cash Balance (403G) is added to the Total Credit Reservations (405G). The temporary storage value for 2nd-Account-Credit-Reservation (614) is set to the Cash Balance (403G). The temporary storage value for Authorization-Period (616) is calculated in seconds as 3,600×[value of 1st-Account-Credit-Reservation (612)+Cash Balance (403G)]/Network Resource Access Gateway's Charge per Hour (207A). The Network Device's Cash Balance (403G) is set to 0.

Alternatively, if there is sufficient credit available, then the Reserve-Credit (615) amount is deducted from the Network Device's Cash Balance (403G) and added to the Total Credit Reservations (405G) for the Account. The temporary storage value for 2nd-Account-Credit-Reservation (614) is then set to the remaining Reserve-Credit (615) amount.

In both cases, the temporary storage value for 2nd-Account-UniqueID (613) is set to the Network Device's Cash Balance UniqueID (305) and processing continues with formulation of the Response (60) as described below with reference to FIGS. 3*l* and 3*m*.

FIGS. 3*h* and 3*i*

FIGS. 3*h* and 3*i* describe the processing to make a credit reservation when the Network Device is configured not to use the Earned Balance First (i.e. Cash Balance must be used first) but there is insufficient credit balance in the Cash Balance Account.

The temporary storage value for 1st-Account-UniqueID (611) is set to the Network Device's Cash Balance UniqueID (305) as the cash balance is always used first.

The Processing Element (11) uses the Network Device Record's (351) Use Earned Balance (307) field to determine whether the Earned Balance should be used Last. If not, the Earned Balance is intended Never to be used and the Requested-Authorization-Period (58) of the Request (40) cannot be satisfied, so a reduced Authorization Period must be calculated as follows: The total amount of the Network Device's Cash Balance (403G) is added to the Total Credit Reservations (405G). The temporary storage value for 1st-Account-Credit-Reservation (612) is set to the Cash Balance (403G). The temporary storage value for Authorization-Period (616) is calculated in seconds as 3,600×Cash Balance (403G)/Network Resource Access Gateway's Charge per Hour (207A). The Network Device's Cash Balance (403G) is set to 0 and processing continues with formulation of the Response (60) as described below with reference to FIGS. 3*l* and 3*m*.

If the Earned Balance should be used Last, then: The total amount of the Network Device's Cash Balance (403G) is added to the Total Credit Reservations (405G). The temporary storage value for 1st-Account-Credit-Reservation (612) is set to the Cash Balance (403G). The Cash Balance (403G) is deducted from the Reserve-Credit (615) amount to leave the amount that must be reserved from the Earned Balance. The Cash Balance (403G) is set to 0. The Trading System User's Earned Balance UniqueID (104B) is used as the key to read the Account Record (453) from Database Storage (12).

The Processing Element (11) must determine whether there is sufficient credit available in the Trading System User's Earned Balance to reserve for the remaining required period of Network Resource authorization. If the Balance (403C) is not greater than or equal to the Reserve-Credit (615) amount, then there is insufficient credit and the Requested-Authorization-Period (58) of the Request (40) cannot be satisfied, so a reduced Authorization Period must be calculated as follows: The total amount of the Trading System User's Earned Balance (403C) is added to the Total Credit Reservations (403G). The temporary storage value for 2nd-Account-Credit-Reservation (614) is set to the Earned Balance (403C). The temporary storage value for Authorization-Period (616) is calculated in seconds as 3,600×[value of 1st-Account-Credit-Reservation (612)+Earned Balance (403C)]/Network Resource Access Gateway's Charge per Hour (207A). The Trading System User's Earned Balance (403G) is set to 0.

Alternatively, if there is sufficient credit available, then the Reserve-Credit (615) amount is deducted from the Trading System User's Earned Balance (403C) and added to the Total Credit Reservations (405C) for the Account. The temporary storage value for 2nd-Account-Credit-Reservation (614) is then set to the remaining Reserve-Credit (615) amount.

In both cases, the temporary storage value for 2nd-Account-UniqueID (613) is set to the Trading System User's Earned Balance UniqueID (104B) and processing continues with formulation of the Response (60) as described below with reference to FIGS. 3*l* and 3*m*.

FIGS. 3*j* and 3*k*

FIGS. 3*j* and 3*k* describe the processing of a Request (40) with Protocol Code Type (52) Re-Request. In this embodiment, an Access Gateway may submit this type of Request (40) to the Network Resource Trading System (10) when it has not received a Response (60) within a pre-defined timeframe. The Network Resource Trading System (10) must determine whether it has already received and processed an earlier Request (40) and therefore has some resource clean-up to do or whether any earlier Request (40) was simply not received and/or fully processed by the Network Resource Trading System (10).

The Processing Element (11) uses the Access Gateway UniqueID (54) and Request Sequence Number (53) from the received Request (40) to seek a corresponding record in the Session-in-Progress Table (500), which is read from Database storage (12). The Request Sequence Number (53) allows the specific session-in-progress to be identified from among potentially multiple active sessions for a given Access Gateway UniqueID (54). If the Access Gateway UniqueID (54) and Request Sequence Number (53) do not correspond to a valid record, there is no active session-in-progress and the Request (40) can be treated as a new First-Request, with processing continuing from exactly the point that a confirmed First-Request is processed as discussed above with reference to FIG. 3*b*.

If a valid session-in-progress record is read, then the session's 1st Account Unique ID to Use (506) is used as the key to read the Account Record (453) from Database Storage (12). The amount of the session's 1st Account Reservation (507) is added to the Account's Balance (403C) and the same amount is subtracted from the Account's Total Credit Reservations (405C), effectively cancelling the credit reservation for this Account.

If the 2nd Account UniqueID to Use (508) is not <Null> (i.e. a credit reservation was also made on a 2nd Account), then the 2nd Account reservation must be cancelled: the session's 2nd Account Unique ID to Use (508) is used as the key to read the Account Record (457) from Database Storage (12). The amount of the session's 2nd Account Reservation (507) is added to the Account's Balance (403G) and the same amount is subtracted from the Account's Total Credit Reservations (405G), effectively cancelling the credit reservation for this 2nd Account.

After the credit reservations have been cancelled, the active Session-in-Progress Record (551) is deleted and processing continues from exactly the point that a confirmed First-Request is processed as discussed above with reference to FIG. 3*b*.

FIGS. 3*l* and 3*m*

FIGS. 3*l* and 3*m* describe the formulation and return of a Response (60) to the original requestor and, if appropriate, the creation of a new Session-in-Progress Record.

Firstly, a blank data message (i.e. null values) in the format of a Response (60) to Authorization is created. If the Authorization-Period (616) is not greater than 0, then no credit is available on the Network Device User's available account(s) and a suitable denial of provision of Network Resources response must be returned to the Requestor (i.e. Access Gateway), so the Protocol Code Type (72) is set to Denied: Insufficient-Credit and processing continues as described below with reference to FIG. 3*p*.

If credit is available, then the Processing Element (11) can create a new blank (i.e. null values) Session-in-Progress Record (551) in Database Storage (12). The Unique SessionID (501) field is set to Current-SessionID (600), a global system-wide unique counter for tracking sessions. The Current-SessionID (600) is instantaneously incremented to its next value. The Session Timestamp (502) field is set to the Network Resource Trading System's (10) current time. The Time Credit Reservations Expires (510) field is set to the Network Resource Trading System's (10) current time+Authorization-Period (616)+Reservation-Claim-Period (601). This field allows records in the Session-in-Progress Table (500) to be expired automatically—and for credit reservations to be reversed—if the reserved credit is not utilized through a claim by an Access Gateway as part of a Terminate-Session Notification (80) within a time period of Reservation-Claim-Period (601) after the end of the time period authorized by the Network Resource Trading System (10). In effect, the Access Gateway receives a grace period (configurable by the implementer or a system administrator) to submit its claims for settlement for Network Resource usage by a Network Device.

The Network Device UniqueID (503) field is set to the decrypted Network Device UniqueID (56) from the Request (40). The Access Gateway UniqueID (504) field is set to the Access Gateway UniqueID (54) from the Request (40). The Request Sequence Number (505) field is set to the Request Sequence Number (53) from the Request (40).

FIGS. 3*n* and 3*o*

FIGS. 3*n* and 3*o* are a continuation of the creation of a new Session-in-Progress Record and the formulation and return of a Response to the original requester (i.e. the Access Gateway)

The 1st Account UniqueID to Use (506) field is set to the temporary storage value for 1st-Account-UniqueID (611). The 1st Account Credit Reservation (507) field is set to the temporary storage value for 1st-Account-Credit-Reservation (612).

If the 2nd-Account UniqueID (613) is not <Null> (i.e. a credit reservation was also made on a 2nd Account), then the 2nd Account UniqueID to Use (508) field is set to the temporary storage value for 2nd-Account-UniqueID (613) and the 2nd Account Credit Reservation (509) field is set to the temporary storage value for 2nd-Account-Credit-Reservation (614).

In the Response (60), the following settings are made: The Protocol Code Type (72) is set to Authorized; the Session-UniqueID (74) is set to Unique SessionID (501) from the Session-in-Progress Record (551); the Session Timestamp (75) is set to the Session Timestamp (502) from the Session-in-Progress Record (551); and the Authorization Period (76) is set to the temporary storage value for Authorization-Period (616).

FIG. 3p

FIG. 3p is a continuation of the creation of a new Session-in-Progress Record and the formulation and return of a Response to the original requestor.

In the Response (60), the following settings are made: the Protocol Identifier and Version (70) are set to "AA10" (hexadecimal), identifying the protocol as 'Authorization and Accounting' and the version as 1.0; the Protocol Code (71) is set to Response-Authorization; the Request Sequence Number (73) is set to the Request Sequence Number (53) from the Request (40); the Secure Hash (77) is computed using the Access Gateway's Shared Secret (208A).

The Authorization Response (60) is sent to the requester, the Access Gateway, as soon as processing is completed, to allow substantially immediate response by the Access Gateway to the User's request for provision of Network Resources.

Processing of the Request (40) ends.

FIGS. 3q and 3r

FIGS. 3q and 3r describe the processing of a received Terminate-Session Notification.

The Processing Element (11) receives the Terminate-Session Notification (80) and first inspects it to confirm that it is valid. It starts by checking that the Protocol Identifier and Version (90) are recognized and supported by the current implementation of the Network Resource Trading System (10). In this embodiment, hex value AA is used to indicate that this is the Network Resource Trading Authorization and Accounting protocol and 10 specifies that it is version 1.0 of the protocol. An invalid value results in a silent discard of the received Notification (80) and an unsupported protocol version results in a suitable error message being returned to the sender as a Response (60). Secondly, the Processing Element (11) confirms that the Protocol Code (91) is a valid 'Terminate-Session' code. Multiple 'Terminate-Session' types may be supported by the implementation, as specified by the Protocol Code Type (92). A Protocol Code Type (92) of First-Request specifies that this is the first request sent by the sending Access Gateway, notifying that a session has been terminated for the specified Network Device for this session. Other Protocol Code Types (92) may be handled if considered necessary by the implementer. Unrecognized Protocol Code Types (92) are discarded and processing ended.

The Processing Element (11) uses the Access Gateway UniqueID (94) contained within the Notification (80) to seek a corresponding record in the Network Resource Access Gateway Table (200), which is read from Database Storage (12). If the Access Gateway UniqueID (94) does not correspond to a valid record, the Notification (80) is silently discarded, as it is potentially a fraudulent Notification (80). If the Access Gateway UniqueID (94) points to a valid record, the Processing Element (11) reads the Access Gateway Record (251) and retrieves the current Shared Secret (208A) for the specified Access Gateway UniqueID (94). It uses the Shared Secret (208A) to compute the secure hash of the entire data payload of the received Notification (80), excluding the Secure Hash value (96). It compares the computed value with the Secure Hash value (96) received in the Notification (80). If the values are not identical, there may have been tampering with the data in the received Notification (80), so the Processing Element (11) silently discards the Request.

FIGS. 3s and 3t

FIGS. 3s and 3t are a continuation of processing of a received Terminate-Session Notification.

The Processing Element (11) uses the Session UniqueID (93) from the received Notification (80) to seek a corresponding record in the Session-in-Progress Table (500), which is read from Database storage (12). The Session UniqueID (93) allows the specific session-in-progress to be uniquely identified. If the Session UniqueID (93) does not correspond to a valid record, there is no active session-in-progress, which means the session has either expired or was never validly created. In this case, a suitable Notification Response for 'Expired or Non-Existent Session' is created and transmitted to the sender of the Notification and further processing ends.

Otherwise, the Processing Element (11) reads the Session-in-Progress Record (551) and calculates the temporary storage value for Chargeable-Amount (617)=Access Gateway's Charge per Hour (207A) multiplied by Session Length (95) specified in the received Terminate-Session Notification (80) divided by 3,600. By way of example, the sample data shown in Terminate-Session Notification (80) and Sample Record 1 (251), this would be 2.00 per hour×1,873 seconds/3,600, which equals 1.04 units (units might typically be US$ or any other desired currency or other measure of value). The network resource usage in this case is the length of time of connection [Session Length (95)], though it could be any alternate measure (volume of data transferred, etc.) in other implementations. This Chargeable-Amount as described below is added to the balance (403). Hence, the user has their balance increased by 1.04 in the sample data for use of their access gateway by the third party.

The Access Gateway's Earned Balance UniqueID (209A) is used as the key to read the Account Record (455) from Database Storage (12).

The Chargeable-Amount (617) is added to the Access Gateway's Balance (403E) and its Balance Expires (404E) time/date is set to the Network Resource Trading System's (10) current time plus global storage value Expiry-Period (602). If the Access Gateway is not set to Consolidate Earnings? (210A), then processing continues as described below with reference to FIGS. 3u and 3v.

Otherwise, the Access Gateway's Owned by UniqueID (202A) is used to read the Trading System User Record (151) from Database Storage (12). The Earned Balance UniqueID (104A) is then used to read the User's Earned Balance Account Record (451) from Database Storage (12). The Chargeable-Amount (617) is added to the User's Earned Balance (403A) and its Balance Expires (404A) time/date is set to the Network Resource Trading System's (10) current time plus global storage value Expiry-Period (602).

FIGS. 3u and 3v

FIGS. 3u and 3v are a continuation of processing of a received Terminate-Session Notification.

The 1st Account UniqueID to Use (506) from the Session-in-Progress Record (551) is used to read the Network Device User's first chargeable Account Record (453) from Database Storage (12). As part of adjusting the Network Device User's account balance, credit reservations must be removed. Firstly, the amount of 1st Account Credit Reservation (507) is subtracted from Total Credit Reservations (405C). Secondly, if the Chargeable-Amount (617) is not greater than (i.e. less than or equal to) the 1st Account Credit Reservation (507) then part of the credit reservation must be reapplied to the Network Device User's Balance as follows: the amount of the 1st Account Credit Reservation (507) minus Chargeable-Amount (617) is added to the Balance (403C) and the subsequent Chargeable-Amount (617) is set to 0.

Otherwise, the amount of 1st Account Credit Reservation (507) is subtracted from the Chargeable-Amount (617) and if the new Chargeable-Amount (617) is not less than or equal to (i.e. is greater than) the 2nd Account Credit Reservation (509), then a revised Chargeable-Amount (617) is set to be the 2nd Account Credit Reservation (509) amount. This prevents Access Gateways from submitting a charge that is greater than their prior total credit reservation.

In both cases, the 2nd Account UniqueID to Use (508) is checked to see if it is NULL (i.e. only the 1st Account had a credit reservation made on it; no need to use a 2nd Account). If not, the 2nd Account UniqueID to Use (508) from the Session-in-Progress Record (551) is used to read the Network Device User's second chargeable Account Record (457) from Database Storage (12). Any second credit reservation must also be removed. Firstly, the amount of 2nd Account Credit Reservation (509) is subtracted from Total Credit Reservations (405G). Secondly, the amount of the 2nd Account Credit Reservation (509) minus Chargeable-Amount (617) is added to the Balance (403G).

In both cases, the Session-in-Progress Record (551) is now moved to the Network Resource Trading System's (10) transaction archive, removing it from active entry in the Session-in-Progress Table (500).

Processing of the Notification is completed.

I claim:

1. A method of authorizing usage and trading of network resources, comprising:
   storing data in first type accounts, each said first type account representing an account of a corresponding network resource user, each said first type account having at least one balance;
   storing data in second type accounts, each said second type account representing an account of a corresponding network resource access gateway operator;
   wherein credit on at least one of said second type accounts acts as credit on at least one of said first type accounts;
   receiving a request from a requestor to authorize substantially immediate provision of network resources, said request containing sufficient information to identify a specific one of said first type accounts and a specific one of said second type accounts;
   responsive to said request, sending a reply to the requestor, authorizing or denying provision of said network resources at least partially dependent on one of said at least one balance of said identified first type account; and
   adjusting one of said at least one balance of said identified first type account and a balance of said identified second account by amounts dependent on said network resources used.

2. The method of claim 1, wherein:
   credit on at least one of said second type accounts acts as credit on at least one of said first type accounts by at least one of:
   configuring said at least one of said first type accounts and said at least one of said second type accounts to use at least one shared account balance;
   allowing at least some credit on a balance of said at least one of said second type accounts to be added to, or substituted for, a balance of said at least one of said first type accounts when performing any calculations or determinations based on said balance of said at least one of said first type accounts;
   allowing at least some credit on a balance of said at least one of said second type accounts to be transferred automatically to a balance of said at least one of said first type accounts; and
   allowing at least some credit on a balance of said at least one of said second type accounts to be transferred under the control of the holder of said second type account directly to a balance of said at least one of said first type accounts.

3. The method defined by claim 1 further comprising database tables storing said first type account data associated with said user.

4. The method defined by claim 3 wherein said tables comprise:
   a trading system user table;
   a network resource access gateway table;
   a network device table;
   an account record table; and
   a session-in-progress table.

5. The method defined by claim 1 wherein said receiving, sending and adjusting utilize a request for authorization for immediate provision of network resources data message, a response to authorization for immediate provision of network resources data message, and a terminate-session notification data message.

6. The method of claim 1, wherein said request is encoded in one or more data messages.

7. A network resource trading exchange system for authorizing usage and trading of network resources, comprising:
   means for storing data in first type accounts, each said first type account representing an account of a corresponding network resource user, each said first type account having at least one balance;
   means for storing data in second type accounts, each said second type account representing an account of a corresponding network resource access gateway operator;
   wherein credit on at least one of said second type accounts acts as credit on at least one of said first type accounts;
   means for receiving a request from a requestor to authorize substantially immediate provision of network resources, said request containing sufficient information to identify a specific one of said first type accounts and a specific one of said second type accounts;
   means responsive to said request for sending a reply to the requestor, authorizing or denying provision of said network resources at least partially dependent on one of said at least one balance of said identified first type account; and
   means for adjusting one of said at least one balance of said identified first type account and a balance of said identified second account by amounts dependent on said network resources used.

8. The method defined by claim 7 further comprising database tables storing said first type account data associated with said user.

9. The method defined by claim 8 wherein said tables comprise:
   a trading system user table;
   a network resource access gateway table;
   a network device table;
   an account record table; and
   a session-in-progress table.

10. The method defined by claim 7 wherein said means for receiving, means for sending and means for adjusting utilize a request for authorization for immediate provision of network resources data message, a response to authorization for immediate provision of network resources data message, and a terminate-session notification data message.

11. A network resource trading exchange system for authorizing usage and trading of network resources, comprising:

a memory storing data in first type accounts, each said first type account representing an account of a corresponding network resource user, each said first type account having at least one balance;

said memory storing data in second type accounts, each said second type account representing an account of a corresponding network resource access gateway operator;

a processing element which operates to enable credit on at least one of said second type accounts to act as credit on at least one of said first type accounts;

a communications element which receives a request from a requestor to authorize substantially immediate provision of network resources, said request containing sufficient information to identify a specific one of said first type accounts and a specific one of said second type accounts;

said processing element responsive to said request, sending a reply to the requestor, authorizing or denying provision of said network resources at least partially dependent on one of said at least one balance of said identified first type account; and said processing element operating to adjust said balance of said identified first account and a balance of said identified second account by amounts dependent on said network resources used.

12. A method of authorizing usage and trading of network resources comprising:

applying network usage credits to a user having an account for accumulating credits based upon usage by at least one third party of a first network resource operated by said user;

substantially immediately processing a request by said user for usage of a second network resource operated by a fourth party and allowing access to said second network resource if said user has at least a predetermined amount of said network usage credits wherein said first and second resources have a registered resource sharing arrangement in a connected system.

13. The method defined by claim 12 further comprising database tables storing data associated with said user and said at least one third party, said data used by a processing element to process said request.

14. The method defined by claim 13 wherein said tables comprise:

a trading system user table;
a network resource access gateway table;
a network device table;
an account record table; and
a session-in-progress table.

15. The method defined by claim 12 wherein said applying and said processing utilize a request for authorization for immediate provision of network resources data message, a response to authorization for immediate provision of network resources data message, and a terminate-session notification data message.

* * * * *